(12) United States Patent
Han et al.

(10) Patent No.: US 10,939,092 B2
(45) Date of Patent: Mar. 2, 2021

(54) MULTIVIEW IMAGE DISPLAY APPARATUS AND MULTIVIEW IMAGE DISPLAY METHOD THEREOF

(71) Applicant: SAMSUNG ELECTRONICS CO., LTD., Suwon-si (KR)

(72) Inventors: Seung-ryong Han, Yongin-si (KR); Chang-yeong Kim, Seoul (KR); Ho-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 188 days.

(21) Appl. No.: 14/743,293

(22) Filed: Jun. 18, 2015

(65) Prior Publication Data

US 2016/0014400 A1 Jan. 14, 2016

(30) Foreign Application Priority Data

Jul. 9, 2014 (KR) ........................ 10-2014-0086286

(51) Int. Cl.
*H04N 13/00* (2018.01)
*H04N 13/349* (2018.01)
*H04N 13/128* (2018.01)

(52) U.S. Cl.
CPC ......... *H04N 13/349* (2018.05); *H04N 13/128* (2018.05)

(58) Field of Classification Search
CPC ........... H04N 13/0445; H04N 13/0022; H04N 13/349; H04N 13/128; G06T 15/00
USPC ................... 348/44, 51, 42, 43, 55; 345/419
See application file for complete search history.

(56) References Cited

U.S. PATENT DOCUMENTS

| 6,593,957 | B1 * | 7/2003 | Christie | ............... | G02B 27/225 |
| | | | | | 348/42 |
| 8,780,111 | B2 | 7/2014 | Kim et al. | | |
| 8,884,952 | B2 | 11/2014 | Kim et al. | | |
| 8,963,913 | B2 | 2/2015 | Baek | | |
| 8,982,187 | B2 | 3/2015 | Wang | | |
| 2011/0310225 | A1 * | 12/2011 | Kitajima | ............... | H04N 13/004 |
| | | | | | 348/43 |

(Continued)

FOREIGN PATENT DOCUMENTS

| CN | 102413339 A | 4/2012 |
| CN | 102761761 A | 10/2012 |

(Continued)

OTHER PUBLICATIONS

Communication dated Apr. 3, 2018 by the State Intellectual Property Office of P.R. China in counterpart Chinese Patent Application No. 201510400469.9.

(Continued)

*Primary Examiner* — Jayanti K Patel
*Assistant Examiner* — Richard B Carter
(74) *Attorney, Agent, or Firm* — Sughrue Mion, PLLC

(57) ABSTRACT

A multiview image display apparatus is disclosed. A multiview image display apparatus includes: a depth adjuster configured to adjust a depth of an input image; a renderer configured to render a multiview image based on the image in which the depth is adjusted; a display configured to display the multiview image in a preset arrangement pattern; and a controller configured to control the depth adjuster in order to extract a saliency region of a user from the input image and adjust a depth value of an object included in the saliency region to a depth value of a preset range.

16 Claims, 20 Drawing Sheets

(56) References Cited

U.S. PATENT DOCUMENTS

| | | | |
|---|---|---|---|
| 2012/0050482 A1* | 3/2012 | Boross | H04N 13/122 348/E13.074 |
| 2012/0069143 A1 | 3/2012 | Chu | |
| 2012/0092468 A1* | 4/2012 | Okamoto | G02B 27/2214 348/55 |
| 2012/0098827 A1* | 4/2012 | Yoshifuji | G02B 27/2214 345/419 |
| 2012/0274629 A1 | 11/2012 | Baek | |
| 2013/0069934 A1* | 3/2013 | Wang | H04N 13/183 345/419 |
| 2013/0257861 A1* | 10/2013 | Kim | G06T 15/00 345/419 |
| 2014/0139515 A1 | 5/2014 | Kim et al. | |
| 2015/0015679 A1* | 1/2015 | Lee | H04N 13/0048 348/51 |
| 2015/0296204 A1* | 10/2015 | Kim | H04N 13/0447 348/51 |

FOREIGN PATENT DOCUMENTS

| | | | | |
|---|---|---|---|---|
| CN | 103248908 A | 8/2013 | | |
| CN | 103369337 A | 10/2013 | | |
| CN | 103413276 A | 11/2013 | | |
| EP | 2648414 A1 * | 10/2013 | ........... | H04N 13/351 |
| KR | 10-2013-0112679 A | 10/2013 | | |
| TW | 201315209 A1 | 4/2013 | | |

OTHER PUBLICATIONS

Communication dated Nov. 15, 2017 by the State Intellectual Property Office of P.R. China in counterpart Chinese Patent Application No. 201510400469.9.

Communication dated Jul. 13, 2018, issued by the Korean Intellectual Property Office in corresponding Korean Application No. 10-2014-0086286.

* cited by examiner

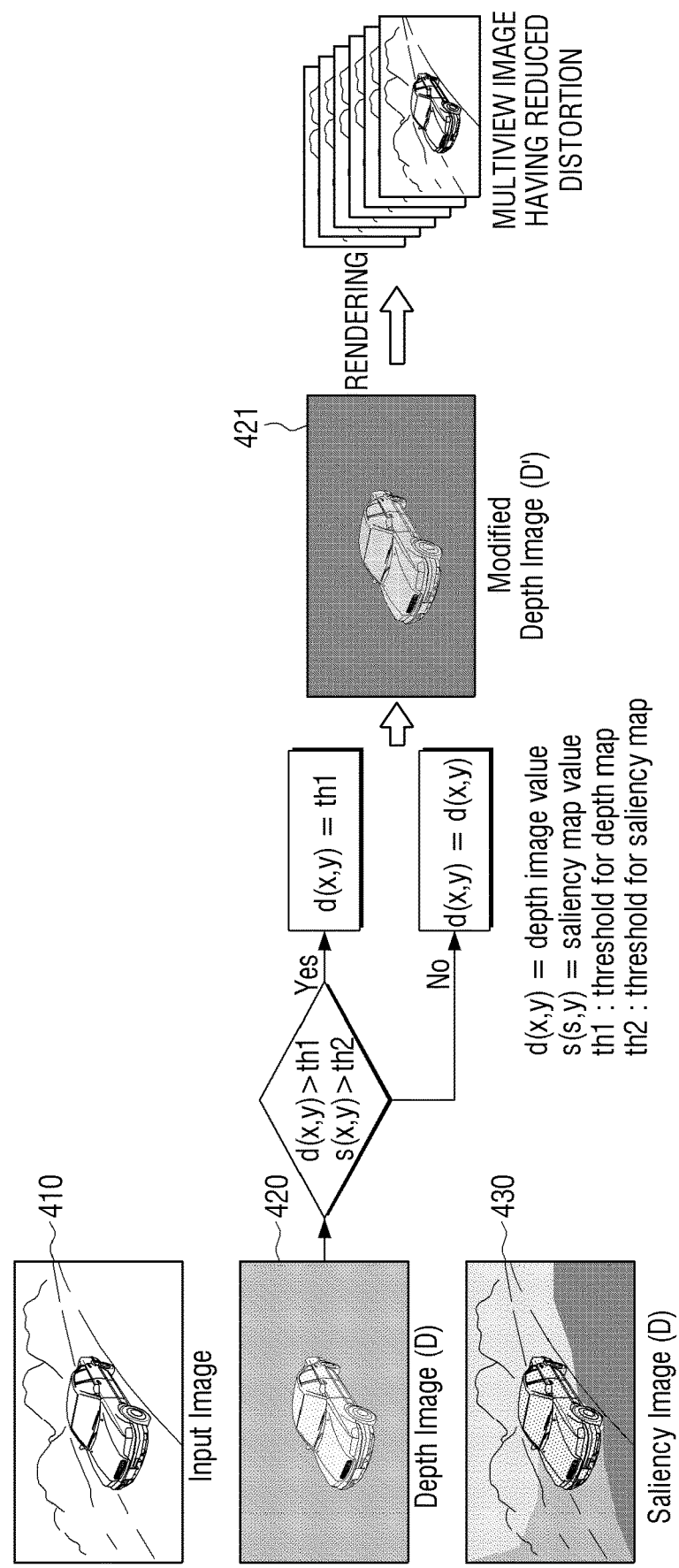

FIG. 6A
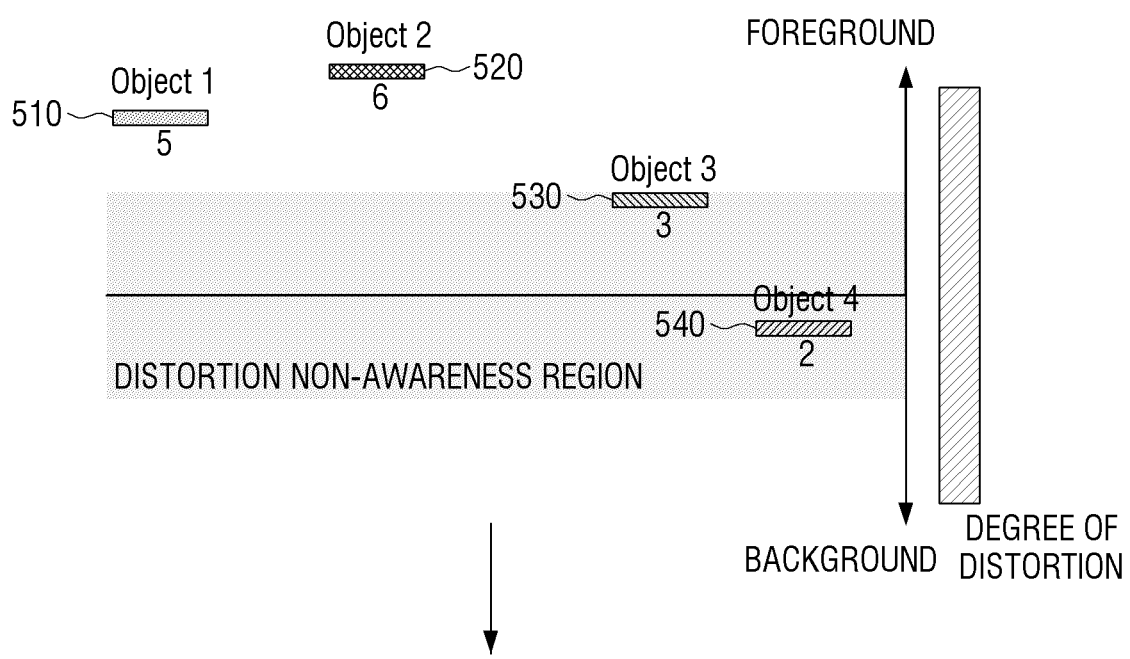
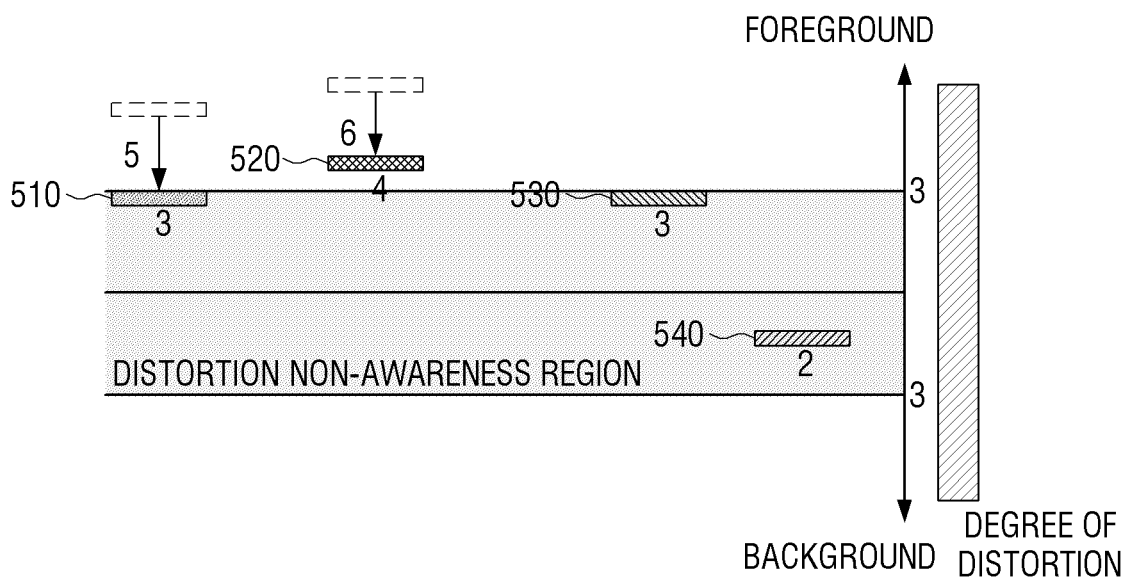

FIG. 6B
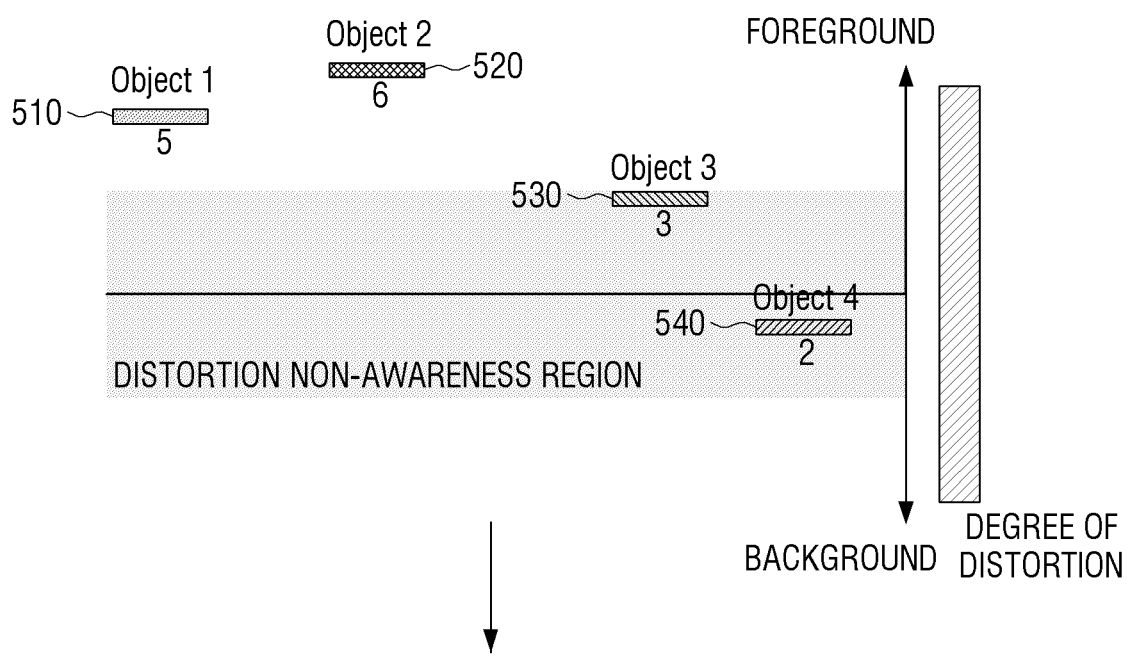
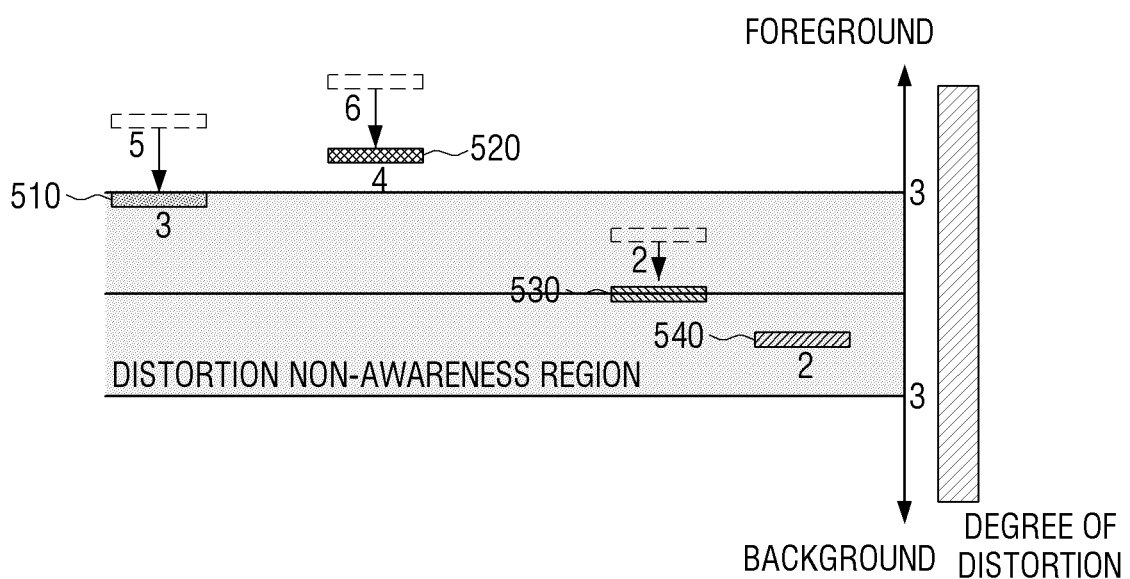

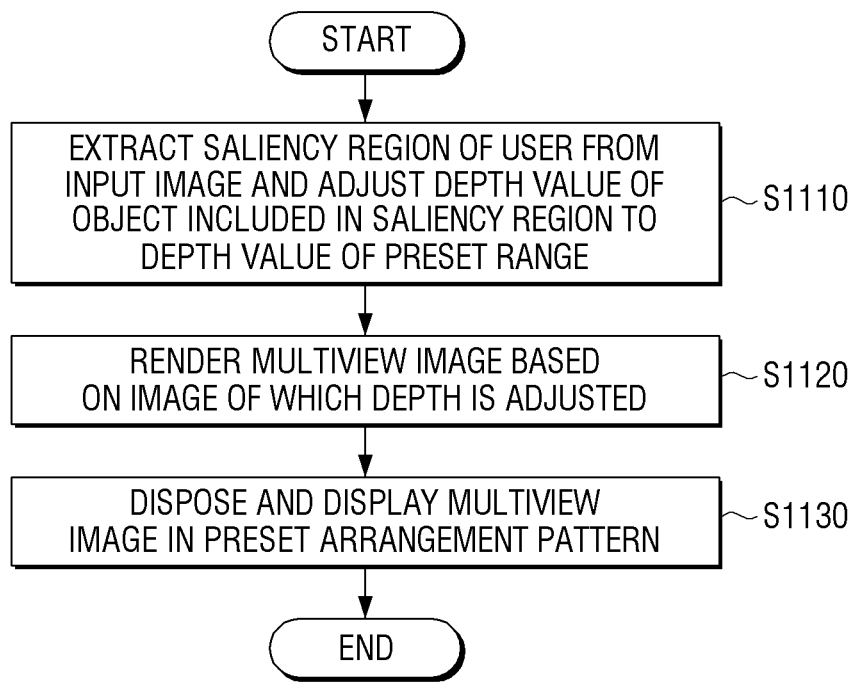

MULTIVIEW IMAGE DISPLAY APPARATUS AND MULTIVIEW IMAGE DISPLAY METHOD THEREOF

CROSS-REFERENCE TO RELATED APPLICATIONS

This application claims priority from Korean Patent Application No. 10-2014-0086286, filed on Jul. 9, 2014, in the Korean Intellectual Property Office, the disclosure of which is incorporated herein by reference in its entirety.

BACKGROUND

1. Field

Exemplary embodiments relate to a multiview image display apparatus and controlling method, and more particularly, to a glassless-type multiview image display apparatus and a multiview image display method thereof.

2. Related Art

In accordance with a development of electronic technology, various types of electronic devices have been developed and come into wide use. Particularly, a display apparatus such as a TV, which is one of the most heavily used home appliances in a home, has been rapidly developed in recent years.

As performance of the display apparatus has been improved, the types of content displayed on the display apparatus has also increased. Particularly, a stereoscopic display system by which 3D (three-dimensional) contents may also be viewed has been recently developed and come into wide use.

The stereoscopic display system may be classified into a glass-type or glassless-type system depending on whether or not 3D image viewing glasses are used.

An example of the glasses-type system includes a display apparatus of a shutter glasses method. The shutter glasses method refers to a method in which a user may feel a 3D effect by alternately outputting a left eye image and a right eye image and alternately opening and closing left and right shutter glasses of 3D glasses worn by the user in connection with the alternately output image.

The glassless-type system is also referred to as an autostereoscopic system. The glassless-type 3D display apparatus allows the user to feel the 3D effect by projecting light corresponding to images of different views to a left eye and a right eye of the user using parallax barrier technology or a lenticular lens while displaying multiview images which are optically separated.

When the glassless type system has N optical views, the glassless type system may provide an image by generating N multiview images by performing rendering for an input image. The generated N multiview images are brought together into a multiview image for displaying by using a view mapping technology. For example, the generated N multiview images are displayed by using a linear mapping method and a cyclic mapping method depending on a view mapping.

FIGS. 1A and 1B are diagrams illustrating display operations of a multiview image according to the linear mapping method.

The linear mapping method, which is a method of matching multiview images from a view 1 to a view 7 to optical views in the order of views 1, 2, 3, 4, 5, 6, 7, 1, 2, 3, . . . , as illustrated in FIGS. 1A and 1B, has a problem that dead zones may occur depending on a viewing position. Here, the dead zone means a position at which the viewing position of the viewer is switched from the view 7 to the view 1, and since serious crosstalk occurs at this position due to a sharp change (jumping phenomenon) of disparity, the 3D image may not be viewed and visual fatigue may be caused to the user. That is, as illustrated in FIGS. 1A and 1B, positions at which a view 7 image and a view 1 image are simultaneously viewed correspond to the dead zones.

The cyclic mapping method, which is a method in which the views are disposed in the order of views 1, 2, 3, 4, 3, 2, and 1, has an advantage capable of alleviating the sharp change of the disparity which is caused in the linear mapping method. However, since images are input to a pair of eyes of human in a left-right inversed state in a pseudo stereo section in which the views are disposed in an inverse order, there is a problem that fatigue at the time of the viewing, particularly, a distortion phenomenon may be caused.

SUMMARY

Exemplary embodiments address the above disadvantages and other disadvantages not described above. The exemplary embodiments are not required to overcome the disadvantages described above, and an exemplary embodiment may not overcome any of the problems described above.

Exemplary embodiments provide a multiview image display apparatus and a multiview image display method thereof capable of reducing a distortion phenomenon in a screen.

According to an aspect of an exemplary embodiment, a multiview image display apparatus includes: a depth adjuster configured to adjust a depth of an input image; a renderer configured to render a multiview image based on the image in which the depth is adjusted; a display configured to display the multiview image in a preset arrangement pattern; a controller configured to extract a saliency region of a user from the input image and control the depth adjuster to adjust a depth value of an object included in the saliency region to a depth value of a preset range.

When the object included in the saliency region is a foreground object and a depth value of the foreground object is not within the preset depth range, the controller may perform control so that the depth value of the foreground object is adjusted to the depth value of the preset range.

The controller may control the depth adjuster so that depth values of remaining objects are adjusted as much as a depth adjustment ratio in which the depth value of the object included in the saliency region is adjusted to the depth value of the preset range.

The multiview image display apparatus may further include: a storage configured to store information on respective depth sections that provide a same three-dimensional (3D) effect to a viewer, wherein the controller may adjust the depth of the object included in the saliency region to a depth value which is close to a focal plane in a depth section that provides the same 3D effect as at least one object, based on the stored information.

The controller may perform a control so that depth values of the object included in the saliency region and an adjacent object are adjusted to the depth value of the preset range.

When a pixel area of the object included in the saliency region is a preset pixel value or more, the controller may perform a control so that the depth value of the object is adjusted to the depth value of the preset range.

The controller may shift the depth value of the input image so that depth values of remaining objects included in the input image are adjusted as much as a degree of adjustment of the depth value of the object included in the saliency region.

The preset range may be a distortion non-awareness section in which a degree of distortion awareness is calculated to be low by an experiment.

The multiview image may be disposed in an inverse order in the preset arrangement pattern and the controller may adjust the depth value of the object included in the saliency region so that a distortion phenomenon is minimized in a pseudo stereo section.

When the multiview image has a total of N views, the preset arrangement pattern may be: an arrangement pattern in which a pattern in which first view to N/2th view are sequentially arranged and N/(2−1)th view to first view are then arranged in an inverse order is repeated, or an arrangement pattern in which a pattern in which one view of odd-numbered and even-numbered views from the first view to the Nth view is sequentially arranged and the other view of the odd-numbered and even-numbered views from the Nth view to the first view is then arranged in an inverse order is repeated.

According to another aspect of another exemplary embodiment, a multiview image display method includes: extracting a saliency region of a user from an input image and adjusting a depth value of an object included in the saliency region to a depth value of a preset range; rendering a multiview image based on the image in which the depth is adjusted; and displaying the multiview image in a preset arrangement pattern.

In the adjusting of the depth value of the object included in the saliency region to the depth value of the preset range, when the object included in the saliency region is a foreground object and a depth value of the foreground object is not within the preset depth range, the depth value of the foreground object may be adjusted to the depth value of the preset range.

In the adjusting of the depth value of the object included in the saliency region to the depth value of the preset range, depth values of remaining objects may be adjusted as much as a depth adjustment ratio in which the depth value of the object included in the saliency region is adjusted to the depth value of the preset range.

In the adjusting of the depth value of the object included in the saliency region to the depth value of the preset range, the depth of the object included in the saliency region may be adjusted to a depth value which is close to a focal plane in a depth section that provides a same three-dimensional (3D) effect as at least one object, based on pre-stored information on the respective depth sections that provide the same 3D effect to a viewer.

In the adjusting of the depth value of the object included in the saliency region to the depth value of the preset range, depth values of the object included in the saliency region and an adjacent object may be adjusted to the depth value of the preset range.

In the adjusting of the depth value of the object included in the saliency region to the depth value of the preset range, when a pixel area of the object included in the saliency region is a preset pixel value or more, the depth value of the object may be adjusted to the depth value of the preset range.

In the adjusting of the depth value of the object included in the saliency region to the depth value of the preset range, the depth value of the input image may be shifted so that depth values of remaining objects included in the input image are adjusted as much as a degree of adjustment of the depth value of the object included in the saliency region.

The preset range may be a distortion non-awareness section in which a degree of distortion awareness is calculated to be low by an experiment.

The multiview image may be disposed in an inverse order in the preset arrangement pattern. In the adjusting of the depth value of the object included in the saliency region to the depth value of the preset range, the depth value of the object included in the saliency region may be adjusted so that a distortion phenomenon is minimized in a pseudo stereo section.

When the multiview image has a total of N views, the preset arrangement pattern may be: an arrangement pattern in which a pattern in which first view to N/2th view are sequentially arranged and N/(2−1)th view to first view are then arranged in an inverse order is repeated, or an arrangement pattern in which a pattern in which one view of odd-numbered and even-numbered views from the first view to the Nth view is sequentially arranged and the other view of the odd-numbered and even-numbered views from the Nth view to the first view is then arranged in an inverse order is repeated.

According to an aspect of another exemplary embodiment, a multiview image processing apparatus is provided. The multiview image processing apparatus includes: a depth adjuster configured to adjust a depth of an input image; a renderer configured to render a multiview image based on the image in which the depth is adjusted; and a controller configured to extract a saliency region of a user from the input image and control the depth adjuster to adjust a depth value of an object included in the saliency region to a depth value of a preset range.

As described above, according to various exemplary embodiments, the distortion phenomenon occurring according to the arrangement pattern of the multiview image in the glassless-type display system may be reduced.

BRIEF DESCRIPTION OF THE DRAWING FIGURES

The above and/or other aspects will be more apparent by describing certain exemplary embodiments with reference to the accompanying drawings, in which:

FIG. 4 is a diagram schematically illustrating an operation of the display apparatus according to an exemplary embodiment;

FIGS. 6A and 6B are diagrams illustrating a depth adjusting method according to another exemplary embodiment;

FIG. 11 is a flow chart illustrating a multiview image display method according to an exemplary embodiment.

DETAILED DESCRIPTION OF THE EXEMPLARY EMBODIMENTS

Hereinafter, various exemplary embodiments will be described in detail with reference to the accompanying drawings.

Figure 2A:
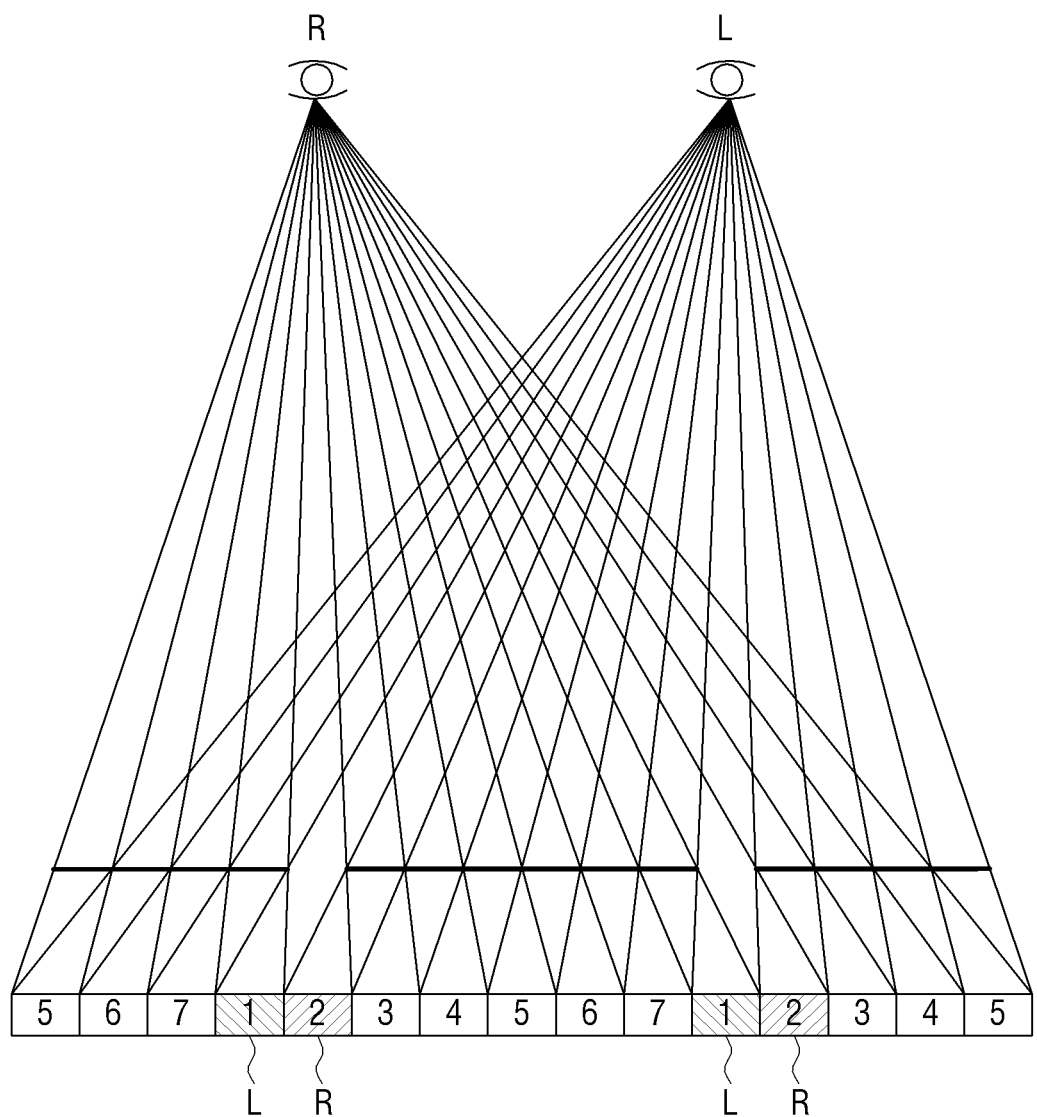
FIGS. 2A to 2C are diagrams illustrating an operation of a glassless-type 3D display apparatus to assist in the understanding of the exemplary embodiments.
Figure 2B:
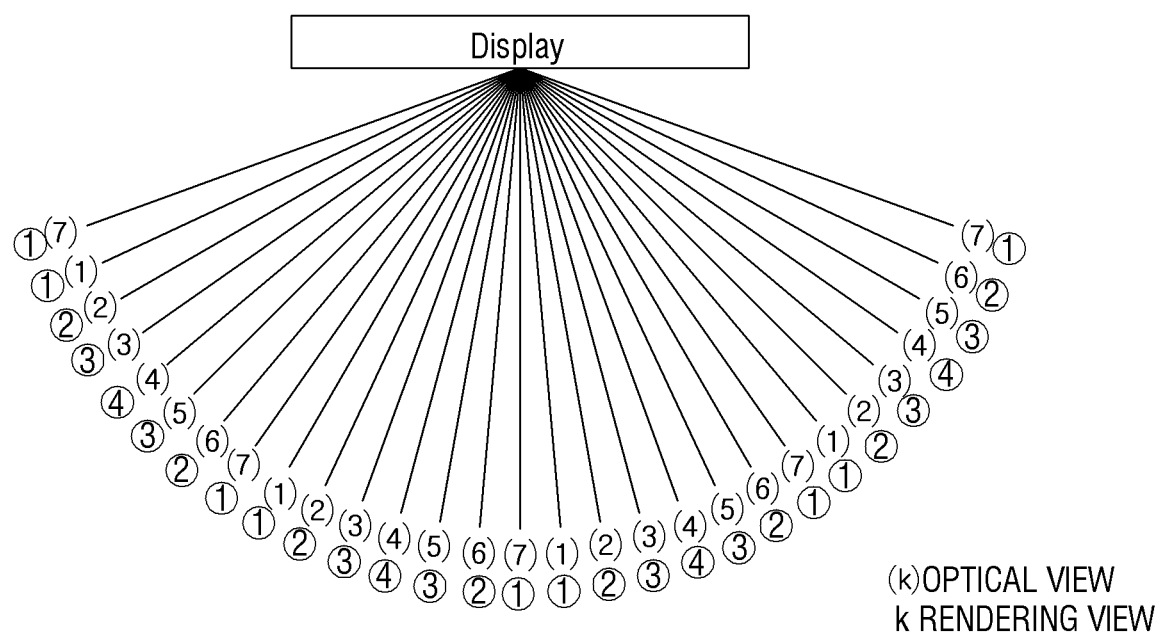
Figure 2C:
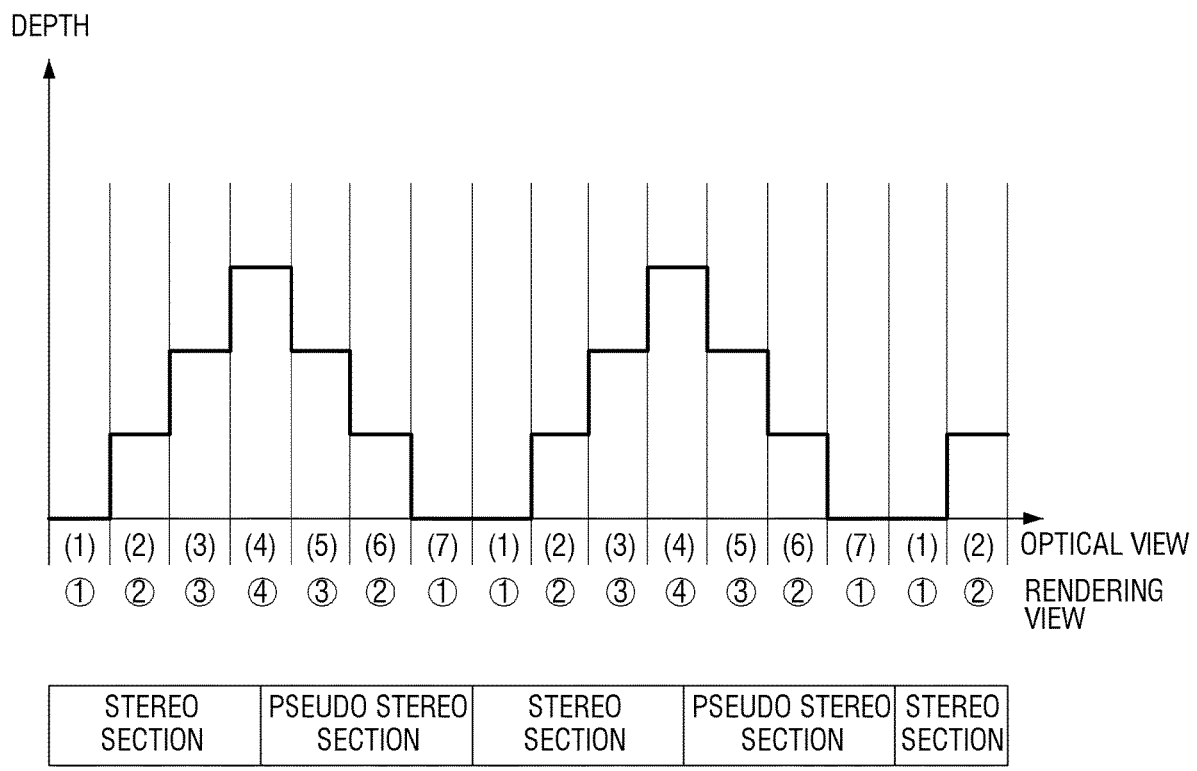

FIGS. 2A to 2C are diagrams illustrating an operation of a glassless-type 3D display apparatus.

FIG. 2A illustrates an operation method of an apparatus displaying a multiview image so as to provide a 3D image in a glassless-type according to an exemplary embodiment. Here, the multiview image includes a plurality of images obtained by photographing the same object at different angles. That is, an image in which the plurality of images photographed at different views are refracted at different angles and are focused to a position (e.g., about 3 meters) spaced apart by a predetermined distance, which is referred to as a so-called viewing distance, is provided. A position at which the above-mentioned image is formed is referred to as a viewing zone. Therefore, when one eye of a user is positioned at a first viewing zone and the other eye is positioned at a second viewing zone, the user may feel a 3D effect.

As an example, FIG. 2A is a diagram illustrating a display operation of a multiview image of a total of 7 views. Referring to FIG. 2A, a glassless-type 3D display apparatus may allow light corresponding to an image of a view 1 of the 7 views to be projected to a left eye and light corresponding to an image of a view 2 of the 7 views to be projected to a right eye. Therefore, since the user views images of different views at the left eye and the right eye, the user may feel the 3D effect.

Figure 1A:
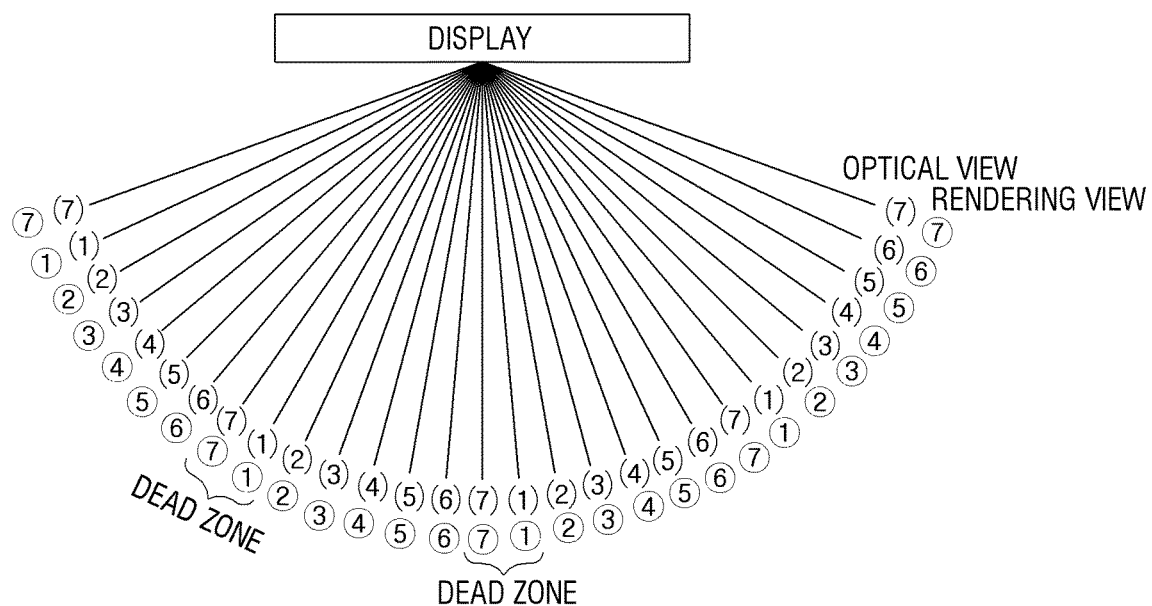
FIGS. 1A and 1B are diagrams illustrating display operations of a multiview image according to the linear mapping method.
Figure 1B:
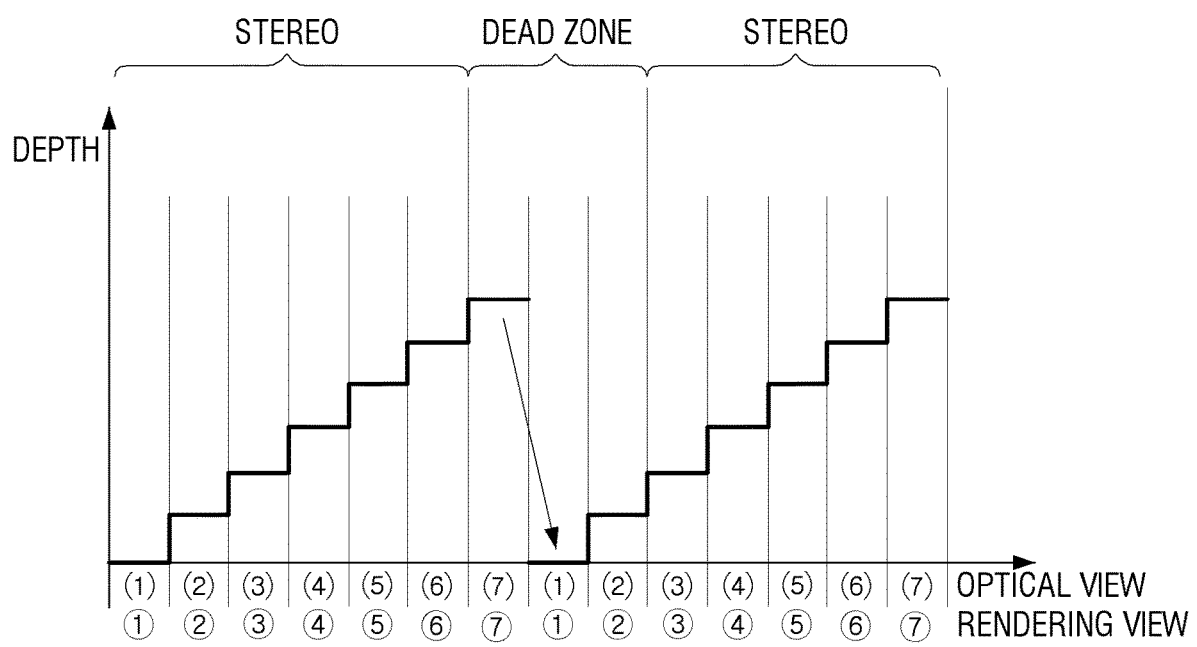

FIGS. 2B and 2C are diagrams illustrating a pattern that disposes the multiview image according to an exemplary embodiment;

According to an exemplary embodiment, the multiview image may be disposed according to the cyclic mapping method in order to solve the problem caused by the linear mapping method described with reference to FIGS. 1A and 1B.

Specifically, when the multiview image has a total of N views, the multiview image may be disposed in an arrangement pattern in which a pattern in which a first view to an N/2-th view are sequentially arranged and an N/2−1-th view to the first view are then arranged in an inverse order is repeated. In this case, when N is an odd number, references in which the views corresponding to an integer larger than N/2 (or an integer smaller than N/2) are disposed in a direct order and an inverse order may be switching views. As an example, as illustrated in FIG. 2B, when the multiview image is a total of 7 views, a fourth view corresponding to 4 which is an integer larger than 7/2 becomes the switching view, and accordingly, the multiview image may be disposed in an arrangement pattern in which a pattern in which a first view to a fourth view are sequentially arranged and the third view to the first view are then arranged in the inverse order is repeated. However, the exemplary embodiments are not limited thereto. For example, the multiview image may also be disposed in an arrangement pattern in which a pattern in which one view of odd-numbered and even-numbered views from the first view to the N-th view is sequentially arranged and the other view of the odd numbered and even-numbered views from the N-th view to the first view is then arranged in the inverse order is repeated. As an example, when the multiview image has a total of 7 views, the multiview image may be disposed in an arrangement pattern in which images of views 1, 3, 5, 7, 6, 4, 2 are repeated.

When the multiview image is disposed according to the cyclic mapping method as illustrated in FIG. 2B, a pseudo stereo section in which the view is disposed in the inverse order occurs. For example, in FIG. 2C, a section of optical views 1 to 4 in which the multiview images 1 to 4 are disposed in the direct order corresponds to a stereo section, and a section of optical views 4 to 7 in which the multiview images 1 to 4 are disposed in the inverse order corresponds to a pseudo stereo section. A distortion phenomenon may occur in the pseudo stereo section described above. However, according to an exemplary embodiment, the distortion phenomenon occurring in the pseudo stereo section is reduced by adjusting a depth of the multiview image.

Hereinafter, a configuration for minimizing the distortion phenomenon occurring in the pseudo stereo section will be described in detail.

Figure 3A:
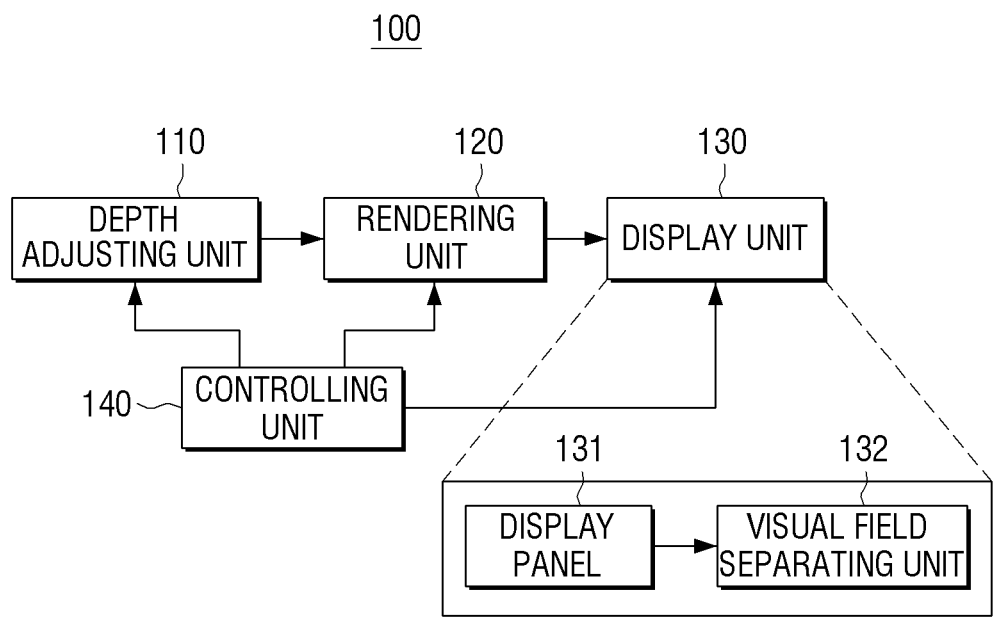
FIGS. 3A and 3B are block diagrams illustrating a configuration of a multiview image display apparatus according to various exemplary embodiments.
Figure 3B:
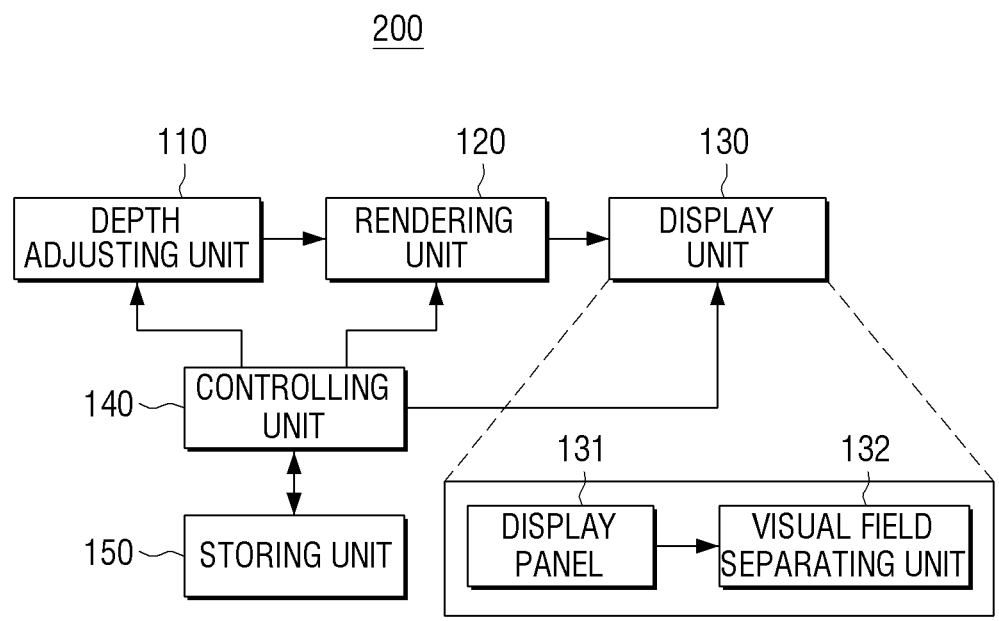

FIGS. 3A and 3B are block diagrams illustrating a configuration of a multiview image display apparatus according to various exemplary embodiments.

FIG. 3A is a block diagram illustrating a configuration of a multiview image display apparatus according to an exemplary embodiment.

Referring to FIG. 3A, a multiview image display apparatus (or multiview image processing apparatus) 100 includes a depth adjusting unit 110 (e.g., a depth adjuster, etc.), a rendering unit 120 (e.g., a renderer, etc.), a display unit 130 (e.g., a display, television (TV), etc.), and a controlling unit 140 (e.g., a controller, processor, etc.).

The multiview image display apparatus 100 may be implemented in various kinds of display apparatuses such as a TV, a monitor, a PC, a tablet PC, an electronic picture frame, a kiosk, a cell phone, and the like.

An image input unit (not shown) receives an image. Specifically, the image input unit (not shown) may be input with or receive the image from a variety of external apparatuses such as an external storage medium, a broadcasting station, a web server, and the like. Here, the input image is any one image of a single view image, a stereo image, and a multiview image. The single view image is an image photographed by a general photographing apparatus, and the stereoscopic image, which is a 3D video image expressed by only a left eye image and a right eye image, is a 3D image photographed by a stereo photographing apparatus. In general, the stereo photographing apparatus is a photographing apparatus including two lenses and is used for photographing the 3D image. In addition, the multiview image means the 3D video image providing various views of several directions to the user by geometrically correcting images photographed by one or more photographing apparatuses and spatially synthesizing the images.

In addition, the image input unit (not shown) may receive depth information of the image. In general, the depth of the image is a depth value assigned to each of pixels of the image. By way of example, the depth of 8 bits may have grayscale values of 0 to 255. For example, based on black and white, the black (low value) may represent a position which is distant from the viewer and the white (high value) may represent a position which is close to the viewer.

The depth information, which is information representing a depth of the 3D image, is information corresponding to a binocular parallax degree between the left eye image and the right eye image configuring the 3D image. A degree of 3D effect felt by human is changed depending on the depth information. That is, when the depth is large, since a binocular parallax between the left and right eyes is large, the human feels the 3D effect to be relatively large, and when the depth is small, since the binocular parallax between the left and right eyes is small, the human feels the 3D effect to be relatively small. The depth information may be generally obtained by a passive method using only two-dimensional characteristics of the image such as a stereo matching and an active method using equipment such as a depth camera. The depth information may have a depth map form.

A depth map means a table including the depth information for each region of the image. The region may also be classified in a pixel unit and may also be defined as a preset region larger than the pixel unit. According to one example, the depth map may have the form in which values smaller than 127 or 128 are represented as a negative (−) value and values larger than 127 or 128 are represented as a positive (+) value, based on 127 or 128 of the grayscale values of 0 to 255 as a reference value, that is, 0 (or focal plane). A reference value of the focal plane may be arbitrarily selected between 0 and 255. The negative value means a sinking and the positive value means a protrusion.

The depth adjusting unit 110 adjusts the depth of the input image based on the depth information. Specifically, the depth adjusting unit 110 may adjust the depth of the input image so that the distortion phenomenon which is able to occur in the pseudo stereo section according to the cyclic mapping method as described above is minimized. A detailed description thereof will be provided in a description of the controlling unit 140 to be described below.

The rendering unit 120 may render at least one of multiview image using the image of which the depth is adjusted by the depth adjusting unit 110.

Specifically, the rendering unit 120 may render the multiview image based on the depth information extracted from a 2D to 3D conversion in a case of the 2D image. Alternatively, the rendering unit 120 may render the multiview image based on at least one view and depth information of N input views. Depth information of a multiview image may include N views and N depth information corresponding to the N views. Alternatively, the rendering unit 120 may extract the depth information from N views when only the N views are input and then render the multiview image based on the extracted depth information.

As an example, the rendering unit 120 may generate the leftmost view and the rightmost view which are the basis of the multiview image by selecting one of the 3D images, that is, the left eye image and the right eye image as a reference view (or a center view). In this case, the rendering unit 120 may generate the leftmost view and the rightmost view based on the corrected depth information corresponding to one of the left eye image and the right eye image which are selected as the reference view. When the leftmost view and the rightmost view are generated, the rendering unit 120 may render the multiview image by generating a plurality of interpolation views between the center view and the leftmost view and generating a plurality of interpolation views between the center view and the rightmost view. However, the exemplary embodiments are not limited thereto, but the rendering unit 120 may also generate an extrapolation view which is generated by an extrapolation method. In the case in which the multiview image is rendered based on the 2D image and the depth information, the 2D image may also be selected as the center view.

However, the detailed operation of the rendering unit 120 described above is merely one example, and the rendering unit 120 may also render the multiview image by various methods, in addition to the operation described above.

The display unit 130 performs a function of providing a multiview image (or a multiple optical views). To this end, the display unit 130 includes a display panel 131 and a visual field separating unit 132 for providing the multiview image.

The display panel 131 includes a plurality of pixels comprising a plurality of sub-pixels. Here, the sub-pixel may be configured of red (R), green (G), and blue (B). That is, the pixels configured of the sub-pixels of R, G, and B may be arranged in a plurality of row and column directions so as to configure the display panel 131. In this case, the display panel 131 may be implemented as various display units such as a liquid crystal display (LCD) panel, a plasma display panel (PDP), an organic light emitting diode (OLED), a vacuum fluorescent display (VFD), a field emission display (FED), an electro luminescence display (ELD), and the like.

The display panel 131 displays an image frame. Specifically, the display panel 131 may display the image frame in which a plurality of images having different views are sequentially and repeatedly disposed.

Although not illustrated in FIG. 3A, in the case in which the display panel 131 is implemented as the LCD panel, the display apparatus 200 may further include a backlight unit (not shown) supplying a backlight to the display panel 131 and a panel driving unit (not shown) driving the pixels of the display panel 131 depending on pixel values of the respective pixels configuring the image frame.

The visual field separating unit 132 (e.g., a visual field separator, etc.) may be disposed on a front surface of the display panel 131, so as to provide different views for each viewing zone, that is, the multiview image. In this case, the visual field separating unit 132 may be implemented by a lenticular lens or a parallax barrier.

For example, the visual field separating unit 132 may be implemented by the lenticular lens including a plurality of lens regions. Therefore, the lenticular lens may refract an image displayed on the display panel 131 by the plurality of lens regions. Each lens region may be formed to have a size corresponding to at least one pixel, so as to disperse light transmitting each pixel to be different for each viewing zone.

As another example, the visual field separating unit 132 may be implemented by the parallax barrier. The parallax barrier is implemented by a transparent slit array including a plurality of barrier regions. Therefore, images having different view for each viewing zones may be emitted by blocking light through a slit between the barrier regions.

Figure 3C:
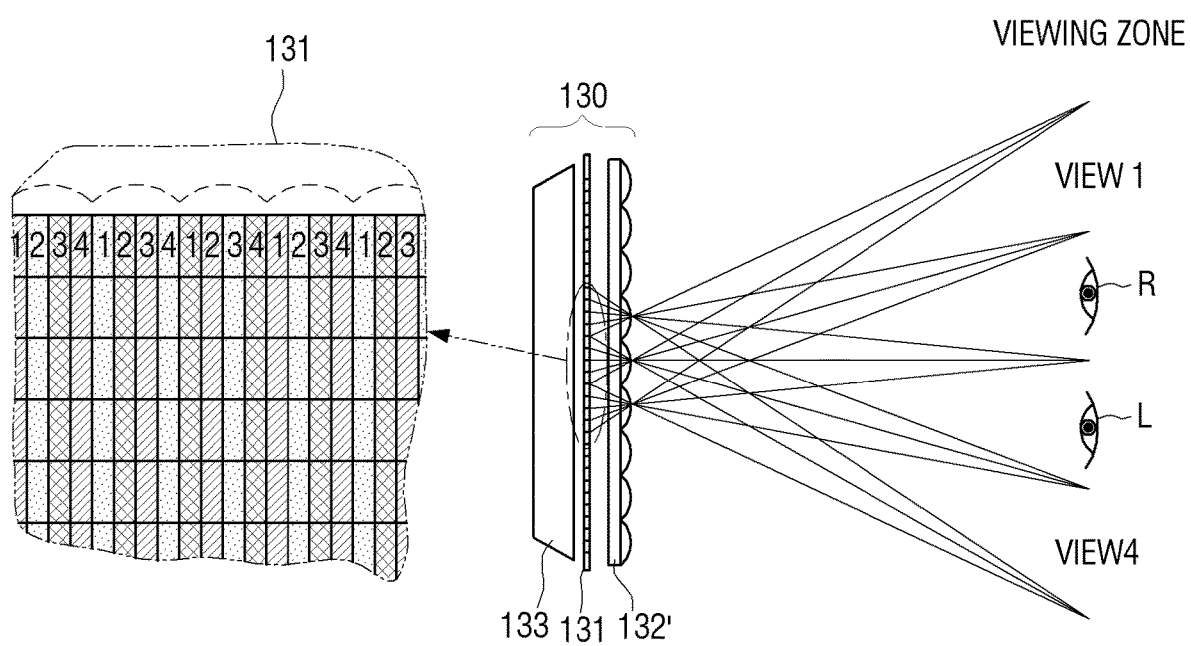
FIG. 3C illustrates a case in which a visual field separating unit is implemented by a lenticular lens array according to an exemplary embodiment.

FIG. 3C describes a case in which the visual field separating unit 132 is implemented by a lenticular lens array according to an exemplary embodiment.

Referring to FIG. 3C, the display unit 130 includes the display panel 131, a lenticular lens array 132', and a backlight unit 133.

Referring to FIG. 3C, the display panel 131 includes a plurality of pixels which are classified in a plurality of columns. Images having different views are disposed in each column. Referring to FIG. 3C, a form in which a plurality of images 1, 2, 3, and 4 having different views are sequentially and repeatedly disposed is illustrated. That is, the respective pixel columns are arranged in groups numbered as 1, 2, 3, and 4. Graphic signals applied to the panel are arranged so that a pixel column 1 displays a first image and a pixel column 2 displays a second image.

The backlight unit 133 provides light to the display panel 131. The respective images 1, 2, 3, and 4 formed on the display panel 131 by light provided from the backlight unit 133 are projected to the lenticular lens array 132', and the lenticular lens array 132' disperses light of the respective projected images 1, 2, 3, and 4 so as to be transferred in a viewer direction. The lenticular lens array 132' generates exit pupils based on a position of the viewer and/or a viewing distance of the viewer. As illustrated, a thickness and a diameter of the lenticular lens in the case in which the visual field separating unit 132 is implemented by the lenticular lens array or an interval between the slits in the case in which the visual field separating unit 132 is implemented by the parallax barrier may be designed so that the exit pupils generated in the respective columns are separated by an average binocular center distance which is less than 65 mm. According to another exemplary embodiment, the manner in which light is dispersed, blocked and/or separated by a device configured to disperse, block, and/or separate light to generate a multi-view image may also be based on the average binocular center distance. The separated image light forms the respective viewing zones. That is, as illustrated in FIG. 3, in the case in which first to fourth views are formed and the left eye and the right eye of the user are positioned at the second view and the third view, respectively, the user may view the 3D image.

Figure 3D:
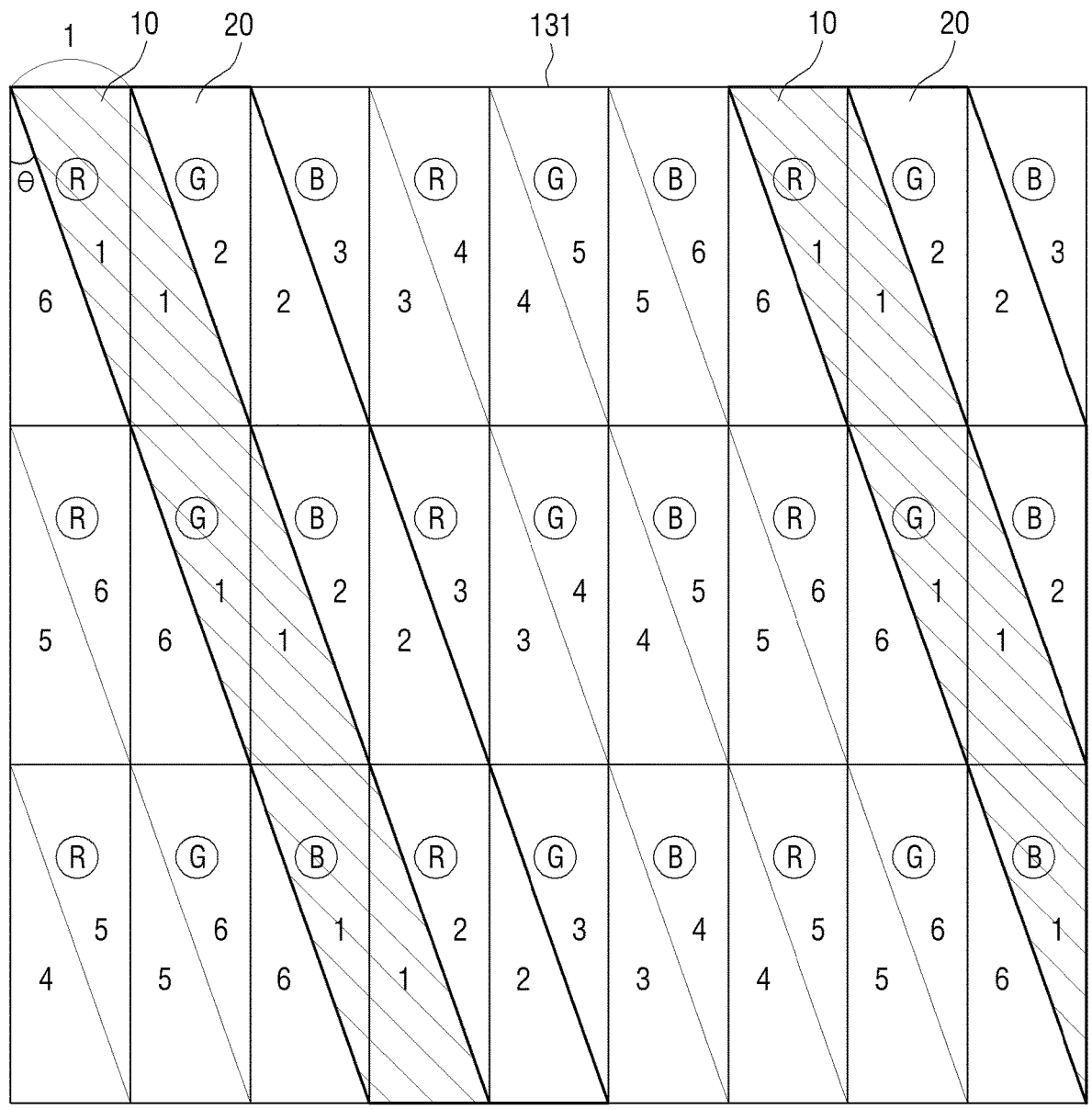
FIG. 3D illustrates that when a total of 6 views are provided, an output image may be rendered so that at least some of the plurality of sub-pixels each output pixel values corresponding to the plurality of multiview images.

The visual field separating unit 132 may be operated in a state tilted at a predetermined angle in order to improve image quality. The controlling unit 140 may generate the image frame by dividing the respective multiview images based on the angle at which the visual field separating unit 132 is tilted, and combining the divided multiview images. The user may not view an image displayed in a vertical direction or a horizontal direction with respect to the sub-pixel of the display panel 131, but may view a zone tilted in a specific direction. Therefore, the viewer may view some of the respective sub-pixels, not a single perfect sub-pixel. For example, when a total of 6 views are provided, an output image may be rendered so that at least some of the plurality of sub-pixels each output pixel values corresponding to the plurality of multiview images, as illustrated in FIG. 3D. In this case, in the case in which the right eye of the viewer views an image of a view 1 and the left eye views an image of a view 2, the right eye of the viewer may view a tilted zone 10 corresponding to the view 1 and the left eye may view a tilted zone 20 corresponding to the view 2. However, a rendered image of FIG. 3D is illustrated as one example, and the number of multiview images, a rendering pitch, and the like may be variously changed according to an implementation example.

The controlling unit 140 may control a general operation of the display apparatus 100.

Particularly, the controlling unit 140 extracts a saliency region of the user from the input image, and controls the depth adjusting unit 110 so that a depth value of an object included in the saliency region is adjusted to a depth value of a preset range. Here, the preset range may be a non-awareness section in which a degree of distortion awareness is calculated to be low by an experiment, or the distortion is hardly recognized or is not recognized.

Specifically, the controlling unit 140 may analyze the image based on an algorithm which is preset in the input image, generate a saliency image (or a saliency map image), and extract a saliency region of the user based on the generated saliency image. Here, as the preset algorithm, various algorithms for generating the saliency map may be used. For example, a saliency region detection method disclosed in an article titled "Salient Region Detection and Segmentation (Radhakrishna Achanta, Francisco Estrada, Patricia Wils, and Sabine SAusstrunk)" may be used, but the present algorithm is not limited thereto.

As an example, one or more feature maps may be generated by extracting feature information from the input image. Here, the feature information may include at least one of luminance, color, texture, motion, and orientation. Thereafter, a low-level attention computation may be performed using the feature map, and a saliency map image for the input image may be generated based on a result of the low-level attention computation.

Alternatively, the controlling unit 140 may extract the saliency region of the user through recognizing a gaze (i.e., gaze recognition) of the user. In this case, the display apparatus 100 may further include a tracking unit (not shown) for the gaze recognition of the user.

The tracking unit (not shown) tracks a position of the user, specifically, a position of a face of the user or positions of multiple faces, so as to provide the corresponding information to the controlling unit 140. To this end, the tracking unit (not shown) may include a photographing unit (not shown) (e.g., a camera, etc.) and a detecting unit (not shown).

The photographing unit (not shown) is disposed at an outer region of the display apparatus 100 so as to photograph the user. For example, the photographing unit (not shown) may be disposed at an upper end central bezel region, a left end central bezel region, or a right end central bezel region of the display apparatus 100, but is not limited thereto.

The photographing unit (not shown) includes a lens module including a lens for the photographing and an image sensor. A shape input through the lens is input to the image sensor serving as a film, as an optical signal, and the image sensor converts the input optical signal into an electrical signal and transfers the electrical signal to the detecting unit (not shown).

The detecting unit (not shown) detects the face position of the user from an image obtained by photographing the user received from the photographing unit (not shown) and tracks the face position of the user. Specifically, the detecting unit (not shown) may track a movement position of the user based on positions of the user face region detected from a previous frame and a current frame and provide the corresponding information to the controlling unit 140.

As a method for detecting a region of a face or regions of multiple faces (i.e., a face region), various methods according to the may be used. Specifically, a direct recognition method and a method using statistic may be used. The direct recognition method creates a rule using physical features such as a contour, a skin color, sizes of components or a distance between the components, and the like of a face image displayed on a screen, and performs a comparison, an examination, and a measurement according to the rule. The method using the statistic may detect the face region according to a pre-learned algorithm.

That is, the method using the statistic is a method of digitizing unique features possessed by the input face and comparing and analyzing the digitized features with a prepared mass database (a face and shapes of other objects). Particularly, the face region may be detected according to the pre-learned algorithm, wherein methods such as a multi layer perception (MLP) and a support vector machine (SVM) may be used. A detailed description thereof will be omitted.

The controlling unit 140 may determine an object which becomes a target of a depth value adjustment based on depth map information and saliency map information having information on the saliency region.

Specifically, the controlling unit 140 may determine the saliency region (or the saliency object) based on the saliency map, determine foreground objects based on the depth map information, and then adjust a depth value for only the saliency object among the foreground objects. Here, the foreground objects mean objects having protrusion intensity, and on the contrary, objects having sinking intensity are referred to as background objects.

That is, when depth values of the objects having the protrusion intensity among the objects included in the saliency region are larger than a depth value of the distortion non-awareness section, the controlling unit 140 may control the depth value of the corresponding object so as to be adjusted to a depth value of a preset range.

In addition, the controlling unit 140 may adjust the remaining objects as well as the objects included in the saliency region so as to have the depth value of the distortion non-awareness section. Specifically, the depth values of the respective objects may be adjusted so that the depth values of all objects included in the input image are decreased or increased at a preset ratio to belong to a depth value range of the distortion non-awareness section and a difference ratio of relative depth values of the respective objects is maintained. Hereinafter, the method of adjusting the depth value described above is referred to as range compression in that there is an effect in which the depth values of the respective objects are compressed.

In addition, the controlling unit 140 may also determine whether or not the depth value is adjusted based on a size of a pixel region occupied by at least one object included in the saliency region of the input image. Specifically, when a pixel area of the object included in the saliency region is a preset pixel value or more, the controlling unit 140 may control the depth value of the object so as to be adjusted to the depth value of the distortion non-awareness section. In this case, only when a pixel area of the foreground object included in the saliency region is the preset pixel value or more, the controlling unit 140 may control the depth value of the object so as to be adjusted to the depth value of the distortion non-awareness section.

In addition, the controlling unit 140 may group the objects in consideration of a depth distribution of objects which are adjacent to the objects included in the saliency region and may correct the depth by recognizing the grouped objects as one object. In this case, the object grouping may be performed according to various references. For example, an adjacent object having a depth value similar to that of the objects included in the saliency region may be grouped as the same group.

As an example, the controlling unit 140 may perform a control so that the depth value of the adjacent object grouped as the same group as the object included in the saliency region due to the depth value similar to that of the object included in the saliency region is adjusted to the depth value of the distortion non-awareness section. That is, the controlling unit 140 may allow depth changes to be smoothly connected in the saliency region of the user by adjusting the depth values of the adjacent object which is not included in the saliency region as well as the object included in the saliency region to the depth value of the distortion non-awareness region. Therefore, since the user views an image having no sharp depth change in the saliency region while the distortion in the pseudo stereo section is reduced, fatigability of eyes may be decreased.

In addition, the controlling unit 140 may shift the depth value of the input image so that the depth values of the remaining objects included in the input image are adjusted as much as a degree of adjustment of the depth value of the object included in the saliency region. For example, in the case in which the object included in the saliency region is adjusted so as to be decreased as much as a depth value 'a' in order to adjust the depth value of the object included in the saliency region to the depth value of the distortion non-awareness section, the controlling unit 140 may maintain the relative depth difference by shifting the depth values of the remaining objects of the input image so as to be decreased as much as the depth value 'a.' Therefore, the viewer may view an image having a mood similar to an original image in a relative depth difference portion while the distortion in the pseudo stereo section is decreased.

In addition, the controlling unit 140 may use a temporal smoothing in which a depth value of each object in a current frame is re-adjusted based on a depth value of each object in an adjacent frame in order to maintain consistency in a temporal direction. Therefore, since the user views an image having no sharp depth change in the saliency region while the distortion in the pseudo stereo section is reduced, fatigability of eyes may be decreased.

As described above, the multiview images are disposed in the inverse order in the preset arrangement pattern by adjusting the depth values of the objects included in the saliency region of the user, such that the distortion phenomenon may be minimized in the sections (see FIGS. 2B and 2C) in which the pseudo stereo occurs.

FIG. 3B is a block diagram illustrating a configuration of a multiview image display apparatus according to another exemplary embodiment.

Referring to FIG. 3B, the multiview image display apparatus 200 includes the depth adjusting unit 110, the rendering unit 120, the display unit 130, the controlling unit 140, and a storing unit 150 (e.g., a storage, a memory, etc.). Since the depth adjusting unit 110, the rendering unit 120, and the display unit 130 among the configurations illustrated in FIG. 2B are the same as those illustrated in FIG. 2A, a detailed description thereof will be omitted.

The storing unit 150 stores information (just noticeable difference in depth (JNDD)) on the respective depth sections that provide the same 3D effect to the viewer. For example, in the case in which a depth of 8 bits has grayscale values of 0 to 255, each of the values of 0 to 255 is not recognized by the viewer as different 3D effects, but the value in a predetermined range may be recognized as the same depth. For example, the depth values between the sections 0 to 4 may provide the same 3D effect to the viewer, and the depth values between the sections 5 to 8 may provide the same 3D effect to the viewer. Here, the information on the respective depth sections that provide the same 3D effect to the viewer may be obtained by the experiment.

When the controlling unit 140 adjusts the depth values of the objects included in the saliency region to the depth value of the distortion non-awareness section, the controlling unit 140 may adjust the depth values of the objects included in the saliency region to a depth value which is close to the focal plane in the depth section that provides the same 3D effect based on the JNDD information stored in the storing unit 150.

For example, it is assumed that a value of 127 is set as the focal plane, the depth sections of a preset range in which the degree of distortion awareness is small are the sections 127 to 134, and the values of the sections 127 to 131 and the sections 132 to 136 provide the same 3D effect to the viewer. In this case, when the depth value of the object included in the saliency region is 136, the depth value of the corresponding object may be adjusted to 134 according to an exemplary embodiment. However, according to another exemplary embodiment in which JNDD is applied, the depth value of the corresponding object may be adjusted to 132 which is close to the focal plane in the sections 132 to 136, which are JNDD sections to which 134 belongs. Therefore, the distortion phenomenon in the pseudo stereo section may be maximally reduced while providing a maximum 3D effect.

FIG. 4 is a diagram schematically illustrating an operation of the display apparatus according to an exemplary embodiment.

Referring to FIG. 4, a modified depth image 421 may be generated based on a depth image (or depth map image) 420 and a saliency image (or saliency map image) 430 which are generated from an input image 410.

Specifically, for a region in which a depth map value d(x, y) is larger than a first threshold value th1 for the depth map and a saliency map value s(x, y) is larger than a second threshold value th2 for the saliency map, the depth value may be adjusted to the first threshold value th1, and otherwise, an original depth map value d(x, y) may be maintained so as to generate the modified depth image 421. Next, the multiview image may be rendered based on the modified depth image 421.

Figure 5A:
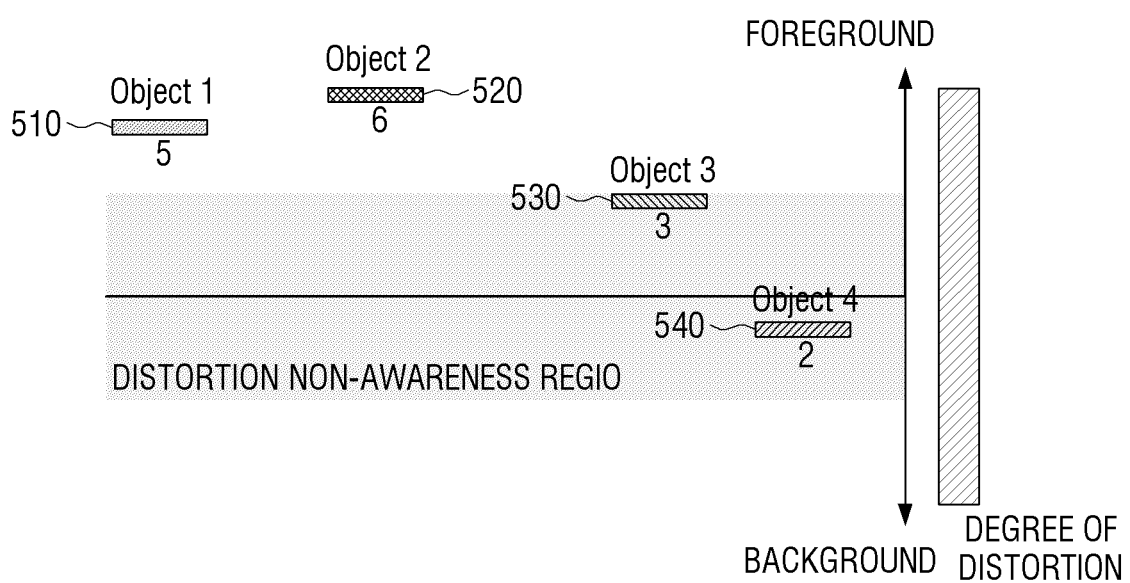
FIGS. 5A and 5B are diagrams illustrating a depth adjusting method according to an exemplary embodiment.
Figure 5B:
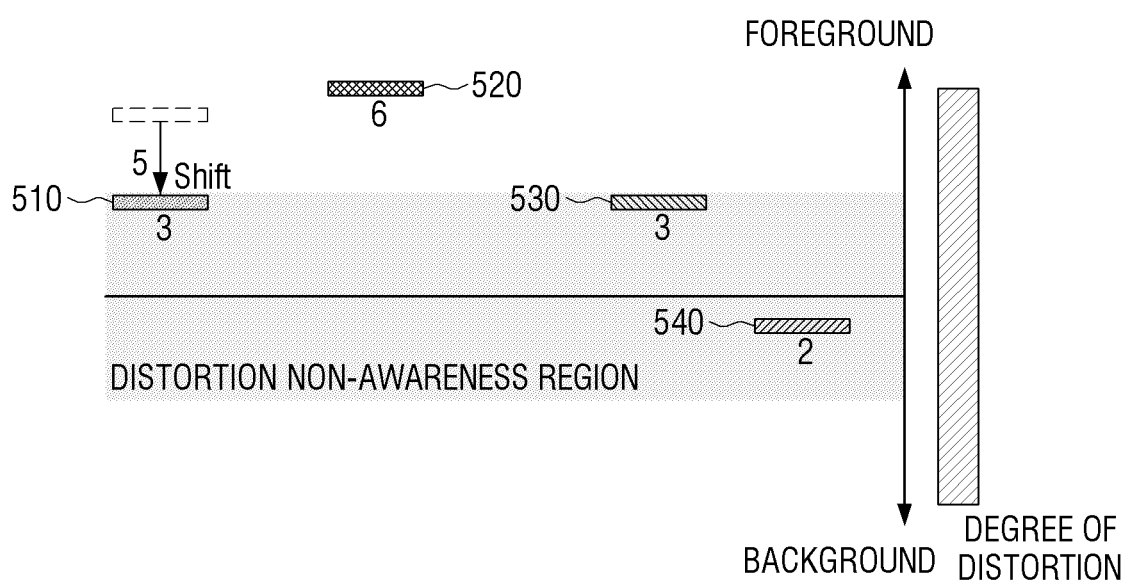

FIGS. 5A and 5B are diagrams illustrating a depth adjusting method according to an exemplary embodiment.

It is assumed that depths of four objects 510, 520, 530, and 540 included in the input image have protrusion intensity of 5, protrusion intensity of 6, protrusion intensity of 3, and sinking intensity of 2, respectively, as illustrated in FIG. 5A.

Here, in the case in which a first object 510 having the protrusion intensity of 5 belongs to the saliency region, the distortion phenomenon in the pseudo stereo section may be reduced by adjusting the depth value of the corresponding object.

Specifically, the depth value of the first object 510 may be shifted to the distortion non-awareness region, for example, a section having sinking intensity of 3 to protrusion intensity of 3. That is, in order to be able to reduce the distortion phenomenon while maximally maintaining the 3D effect, the depth value of the first object 510 may be shifted to have a value of 3, which is maximum protrusion intensity in the distortion non-awareness region as shown in FIG. 5B. Therefore, the distortion degree felt by the viewer in the pseudo stereo section may be reduced.

FIGS. 6A and 6B are diagrams illustrating a depth adjusting method according to another exemplary embodiment.

According to another exemplary embodiment, depth values of the adjacent object as well as the objects belonging to the saliency region, or all objects may also be adjusted.

When the same case as that illustrated in FIG. 5A is assumed, in FIG. 6 unlike FIG. 5B, the depth values of a first object 510 having protrusion intensity of 5 belonging to the saliency region and a second object 520, which is the adjacent object of the corresponding object may also be adjusted.

Specifically, as illustrated in FIG. 6A, the depth value of the first object 510 may be shifted to the distortion non-awareness region, for example, a section having sinking intensity of 3 to protrusion intensity of 3, and the depth value of the second object 520, which is the adjacent object may be shifted as much as the first object 510 is shifted, at the same time.

Alternatively, as illustrated in FIG. 6B, the depth values of all objects included in the input image may be adjusted.

Specifically, as illustrated in FIG. 6B, the depth value of the first object 510 may be shifted to the distortion non-awareness region, for example, the section having sinking intensity of 3 to protrusion intensity of 3, and depth values of foreground objects 520 and 530 among the remaining objects may be shifted as much as the first object 510 is shifted, at the same time.

Figure 7:
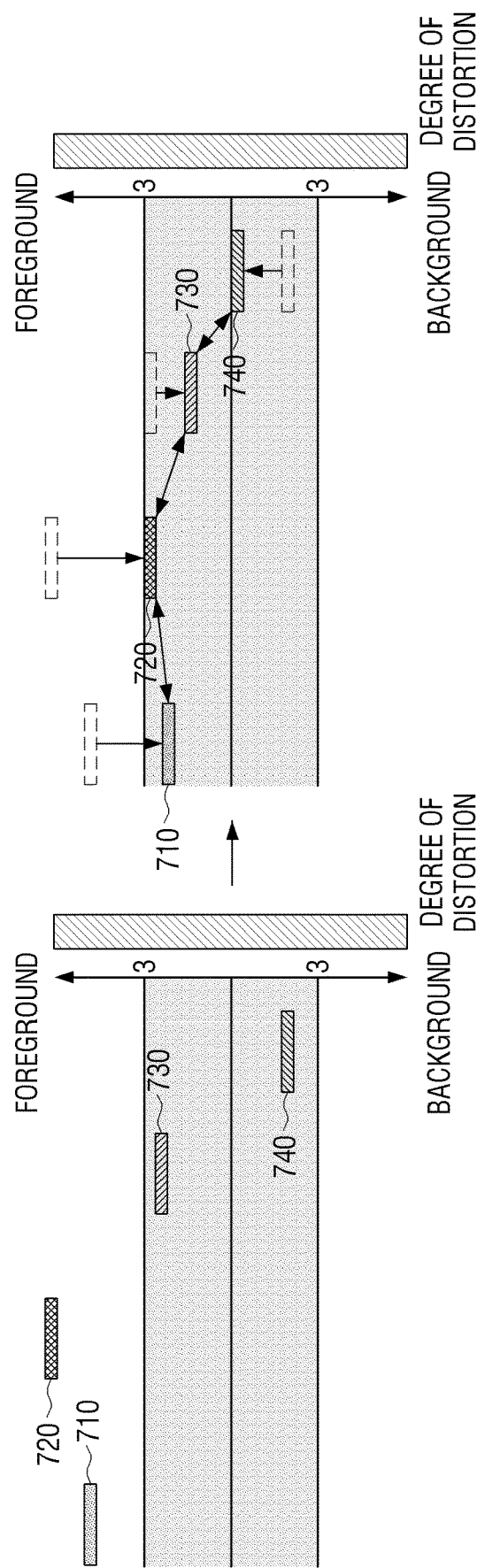
FIG. 7 is a diagram illustrating a depth adjusting method according to still another exemplary embodiment.

FIG. 7 is a diagram illustrating a depth adjusting method according to still another exemplary embodiment.

As illustrated in FIG. 7, according to still another exemplary, the object included in the saliency region and the remaining objects may also be adjusted to have the depth value of the distortion non-awareness section by using the range compression method described above.

Specifically, the depth values of the respective objects may be adjusted so that the depth values of all objects 710 to 740 included in the input image are decreased or increased at a preset ratio to belong to a depth value range of the distortion non-awareness section and a difference ratio of relative depth values of the respective objects 710 to 740 is maintained.

For example, the depth value of the second object 720 having largest protrusion intensity is adjusted so as to belong to the distortion non-awareness section and the depth values of the remaining objects 710, 730, and 740 are also adjusted at the same ratio, thereby making it possible to allow the depth values of all objects 710 to 740 to belong to the distortion non-awareness section.

Figure 8:
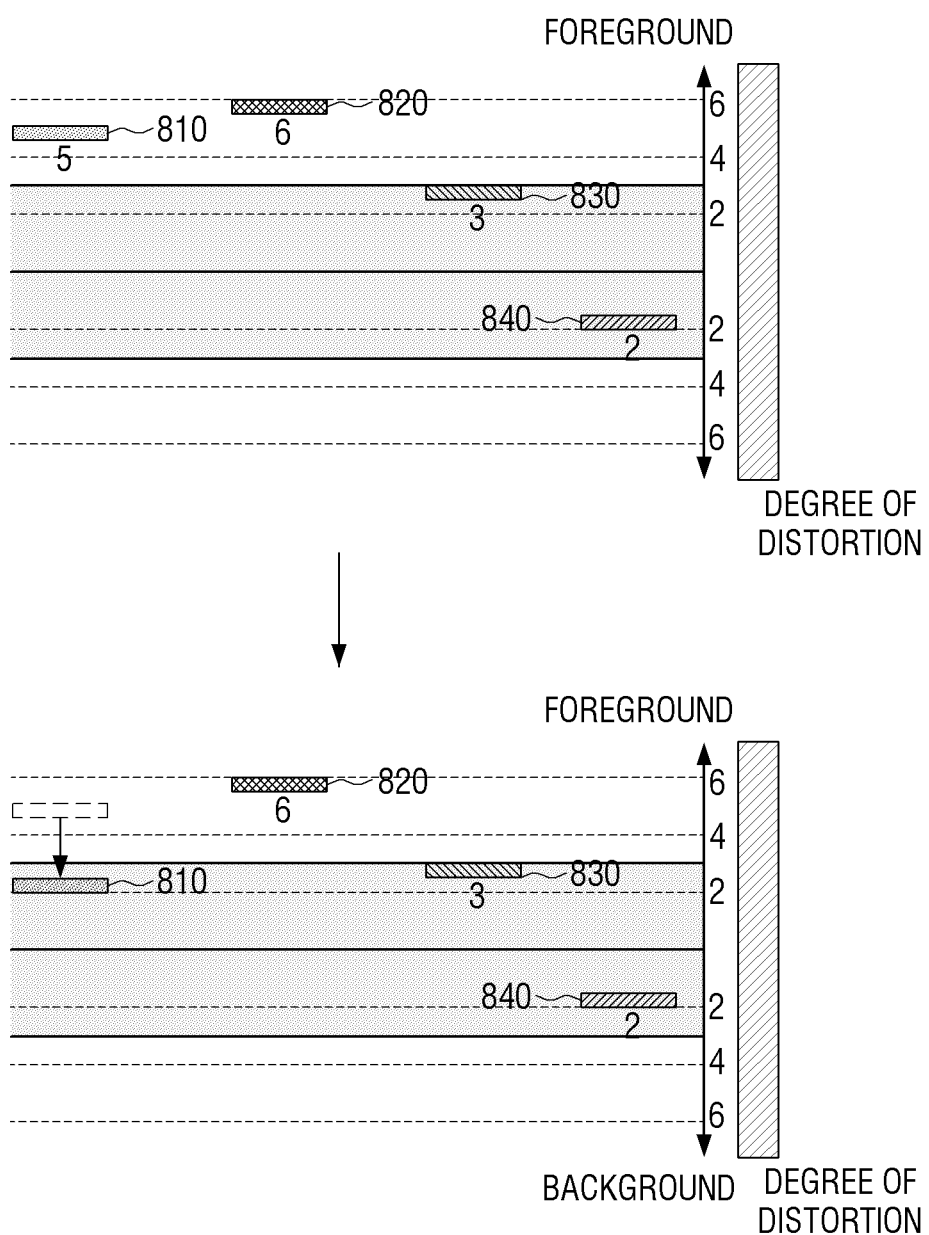
FIG. 8 is a diagram illustrating a depth adjusting method according to still another exemplary embodiment.

FIG. 8 is a diagram illustrating a depth adjusting method according to still another exemplary embodiment.

As illustrated in FIG. 8, according to still another exemplary embodiment, the depths for the objects included in the input image may be adjusted based on information on the respective depth sections (JNDD described above) that provide the same 3D effect to the viewer.

As an example, as illustrated in FIG. 8, it is assumed that the depth values between the sections 0 to 2 provide the same 3D effect to the viewer, the depth values between the sections 2 to 4 provide the same 3D effect to the viewer, the depth values between the sections 4 to 6 provide the same 3D effect to the viewer, and the distortion non-awareness section has sinking intensity of 3 to protrusion intensity of 3.

Here, when the foreground object belonging to the saliency region is a first object 810, a depth value of the first object 810 may be adjusted to a value which is close to the focal plane in a depth section that provides the same 3D effect while being adjusted so as to belong to the distortion non-awareness section. That is, the depth value of the first object 810 is not adjusted to 3, which is the largest depth value in the distortion non-awareness section, but may be adjusted to the depth value of 2 which is close to the focal plane in a section of depth values 2 to 4, which is a depth section that provides the same 3D effect, to which the depth value of 3 belongs. Therefore, the distortion phenomenon may be reduced to the minimum while providing the 3D effect as equal as possible. In this example, the depth values of the objects 820, 830 and 840 may not be adjusted.

However, the numerical values described above are illustrated for convenience of explanation, and the information on the depth sections that provide the same 3D effect may be obtained by the experiment.

In addition, the exemplary embodiment associated with JNDD described above may be equally applied to the exemplary embodiment of FIGS. 6A and 6B, but a detailed description thereof will be omitted.

Figure 9:
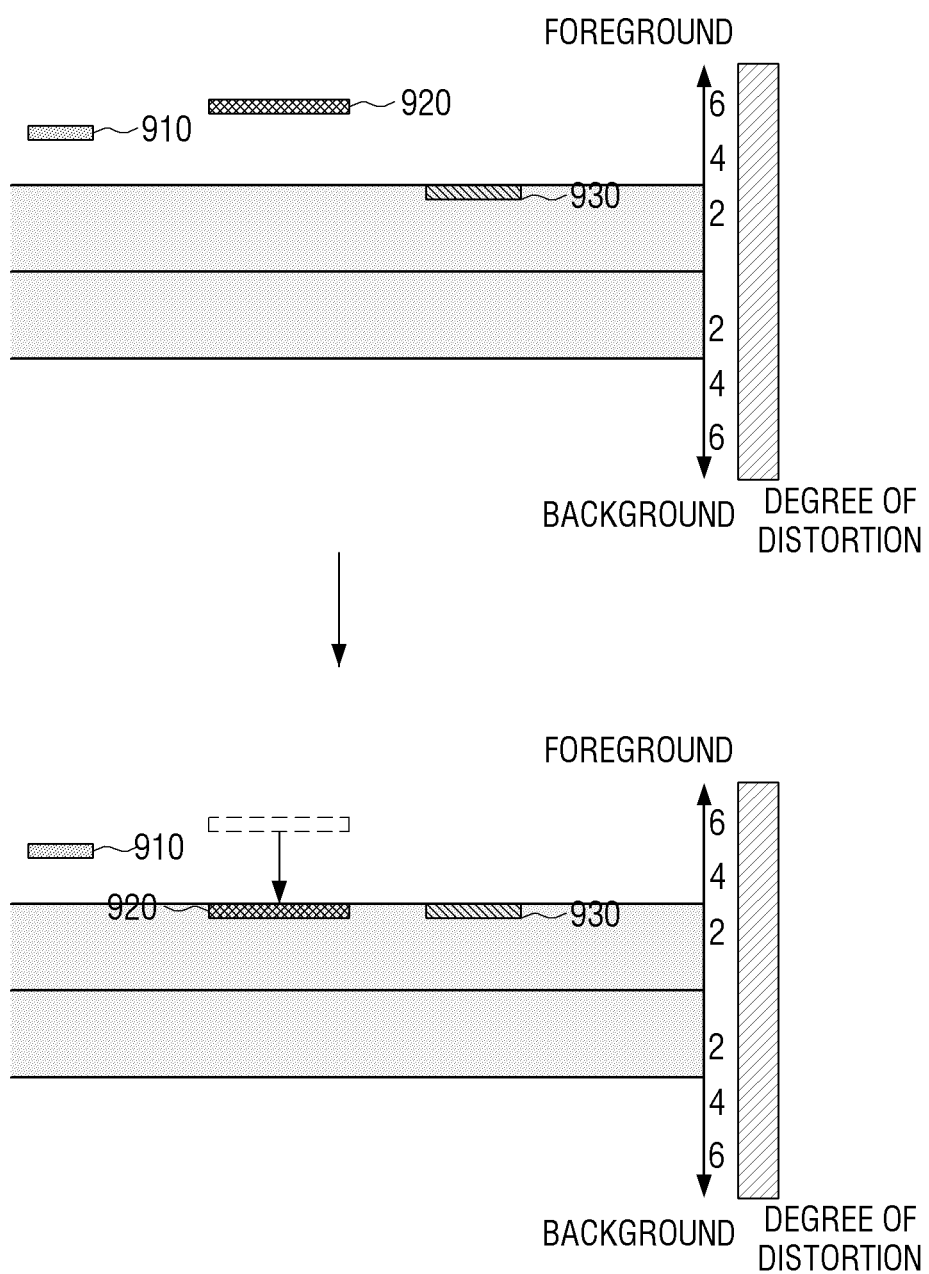
FIG. 9 is a diagram illustrating a depth adjusting method according to still another exemplary embodiment.

FIG. 9 is a diagram illustrating a depth adjusting method according to still another exemplary embodiment.

Referring to FIG. 9, depth values of foreground objects 910 and 920 may be adjusted based on pixel areas of the foreground objects 910 and 920 belonging to the saliency region.

Specifically, as illustrated in FIG. 9, even in the case in which both first and second objects 910 and 920 are objects belonging to the saliency region, a depth value of the first object 910 having the pixel area which is less than a preset area may be maintained and only a depth value of the second object 920 having the pixel area which is the preset area or more may be adjusted to the depth value of the distortion non-awareness section. Here, the preset area which is the basis of the adjustment of the depth value may be obtained by an experiment based on a distortion degree depending on a size of the object. In this example, the depth value of the third object 930 may not be adjusted.

Figure 10A:
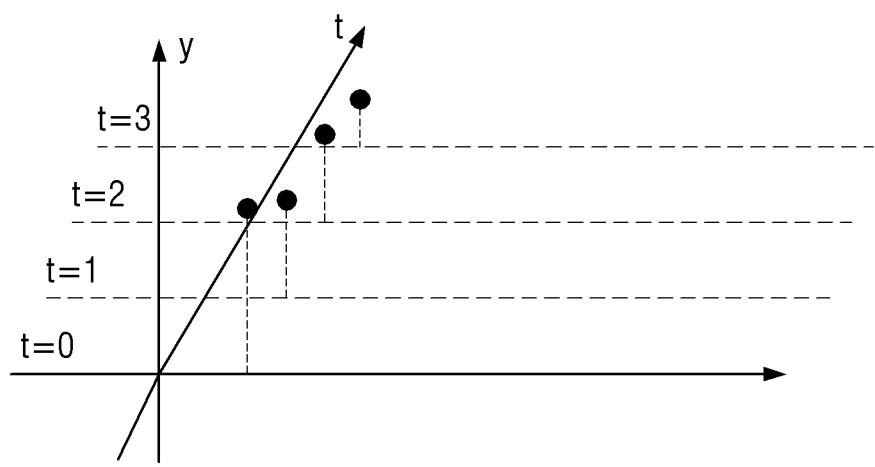
FIGS. 10A and 10B are diagrams illustrating a depth adjusting method according to still another exemplary embodiment.
Figure 10B:
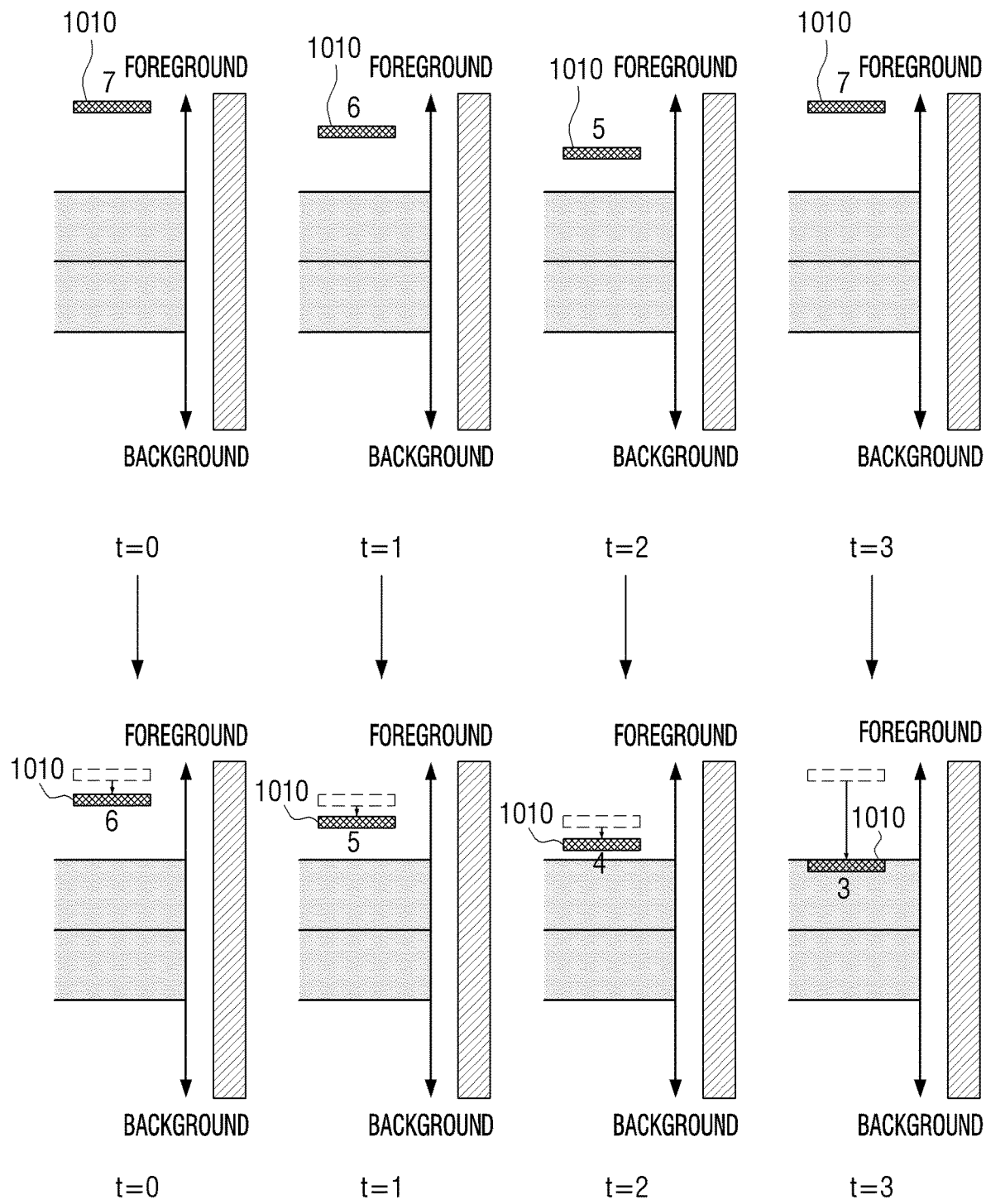

FIGS. 10A and 10B are diagrams illustrating a depth adjusting method according to still another exemplary embodiment.

Referring to FIG. 10A, a temporal smoothing in which a depth value of each object in a current frame is re-adjusted based on a depth value of each object in an adjacent frame in order to maintain consistency in a temporal direction.

For example, a re-adjusted depth value $P_3'$ of a specific object in a frame at t=3 may be calculated based on the following Mathematical expression.

$$P_t = \sum_{k=-a}^{a} W_{t+k} P_{t+k}$$ [Mathematical expression 1]

where, $P_t$ and $P_{t+k}$ each represent a depth value of specific object at t and t+k, and $W_{t+k}$, which is a weight applied to a depth value at t+k, may be determined by taking account of various factors.

Referring to FIG. 10B illustrating one example to which the temporal smoothing is applied, the depth may be adjusted by applying the temporal smoothing.

Specifically, a depth value of a foreground object belonging to the saliency region may be gradually adjusted over a plurality of frames so as to be smoothly adjusted to the depth value belonging to the distortion non-awareness section.

For example, as illustrated in FIG. 10B, it is assumed that a depth value of a foreground object 1010 belonging to the saliency region has protrusion intensity of 7, the distortion non-awareness section has sinking intensity of 3 to protrusion intensity of 3, and a target depth value of the foreground object has protrusion intensity of 3.

In this case, the depth value of the corresponding object 1010 may reach protrusion intensity of 3, which is the target depth value by gradually adjusting the depth value of the corresponding object 1010 over the preset number of frames. However, this is merely the case according to an exemplary embodiment, and in the case in which the temporal smoothing is not applied, it is apparent that the depth value of the corresponding object 1010 may be directly adjusted to protrusion intensity of 3 in one frame.

FIG. 11 is a flow chart illustrating a multiview image display method according to an exemplary embodiment.

According to the multiview image display method illustrated in FIG. 11, first, a saliency region of a user is extracted from an input image and a depth value of an object included in the saliency region is adjusted to a depth value of a preset range (S1110). Here, the preset range may be a distortion non-awareness section in which a degree of distortion awareness is calculated to be low by an experiment.

Next, a multiview image is rendered based on the image of which a depth is adjusted (S1120).

Next, the multiview image is disposed and displayed in a preset arrangement pattern (S1130).

Here, in S1110 in which the depth value of the object included in the saliency region is adjusted to the depth value of the preset range, when the object included in the saliency region is a foreground object and a depth value of the foreground object is not within a preset depth range, the depth value of the foreground object may be adjusted to the depth value of the preset range.

In addition, in S1110, depth values of the remaining objects may be adjusted as much as a depth adjustment ratio in which the depth value of the object included in the saliency region is adjusted to the depth value of the preset range.

In addition, in S1110, the depth of the object included in the saliency region may be adjusted to a depth value which is close to a focal plane in a depth section that provides the same 3D effect as at least one object, based on pre-stored information on the respective depth sections that provide the same 3D effect to the viewer.

In addition, in S1110, depth values of the object included in the saliency region and an adjacent object may be adjusted to the depth value of the preset range.

In addition, in S1110, when a pixel area of the object included in the saliency region is a preset pixel value or more, the depth value of the object may be adjusted to the depth value of the preset range.

In addition, in S1110, a depth value of the input image may be shifted so that the depth values of the remaining objects included in the input image are adjusted as much as a degree of adjustment of the depth value of the object included in the saliency region.

In addition, in S1110, the depth value of the object included in the saliency region may be adjusted so that the distortion phenomenon is minimized in a section in which a pseudo stereo is generated due to the multiview image which is disposed in an inverse order in the preset arrangement pattern.

In the case in which the multiview image has a total of N views, the preset arrangement pattern may be an arrangement pattern in which a pattern in which first view to N/2-th view are sequentially arranged and N/2−1-th view to first view are then arranged in an inverse order is repeated, or an arrangement pattern in which a pattern in which one view of odd-numbered and even-numbered views from the first view to the N-th view is sequentially arranged and the other view of the odd-numbered and even-numbered views from the N-th view to the first view is then arranged in an inverse order is repeated.

As described above, according to various exemplary embodiments, the distortion phenomenon occurring according to the arrangement pattern of the multiview image in the glassless-type display system may be reduced.

The multiview image display method according to various exemplary embodiments described above may be implemented in a program so as to be provided to the display apparatus.

As an example, a non-transitory computer readable medium having a program stored thereon may be provided, wherein the program performs an operation of extracting a saliency region of a user from an input image and adjusting a depth value of an object included in the saliency region to a depth value of a preset range, an operation of rendering a multiview image based on an image of which a depth is adjusted, and an operation of disposing and displaying the multiview image in a preset arrangement pattern.

The non-transitory computer readable medium may be a medium storing data for a short period such as a register, a cash, a memory, or the like, and/or may also be a machine-readable medium semi-permanently storing the data. Specifically, various applications or programs described above may be stored and provided in the non-transitory computer readable medium such as a compact disc (CD), a digital versatile disk (DVD), a hard disk, a Blu-lay disk, a universal serial bus (USB), a memory card, a read-only memory (ROM), or the like.

Although the exemplary embodiments have been shown and described, it should be understood that the inventive concept is not limited to the disclosed exemplary embodiments and may be variously changed without departing from the spirit and the scope of the inventive concept. Therefore, the exemplary embodiments should be construed as including all the changes, equivalents, and substitutions included in the spirit and scope of the inventive concept.

What is claimed is:

1. A multiview image display apparatus comprising:
    a depth adjuster;
    a renderer;
    a display; and
    a controller configured to identify a saliency region of a user from an input image,
    control the depth adjuster to adjust a depth value of an object included in the saliency region to a depth value of a predetermined range, and
    control the renderer to render a multiview image comprising a plurality of images of different viewpoints based on an image in which the depth value is adjusted, and
    control the display to display the multiview image,
    wherein the multiview image is rendered based on a predetermined arrangement,
    wherein the multiview image has a total of N views,
    wherein a pattern of the predetermined arrangement includes an arrangement pattern where a pattern in which a first view to an (N/2)th view are sequentially arranged and an (N/2)−1th view to the first view are inversely arranged is repeated,
    wherein, based on the N being an odd number, the pattern in which the first view to an Ath view are sequentially arranged and a Bth view to the first view are inversely arranged is repeated, where A is an integer greater than (N/2) and B is an integer smaller than (N/2),
    wherein the controller is further configured to control the depth adjuster to adjust the depth value of the object included in the saliency region based on information on respective depth sections, and wherein each of different depth values included in each section of the respective depth sections provides a same three-dimensional (3D) effect to a viewer in the each section,
    wherein the controller is further configured to control the depth adjuster to adjust the depth value of the object included in the saliency region to a depth value close to a reference value, from among the different depth values included in the each section, and
    wherein the reference value is a maximum protrusion intensity in a distortion non-awareness section.

2. The multiview image display apparatus as claimed in claim 1, wherein when the object included in the saliency region is a foreground object and a depth value of the foreground object is not within the predetermined range, the controller performs a control so that the depth value of the foreground object is adjusted to the depth value of the predetermined range.

3. The multiview image display apparatus as claimed in claim 1, wherein the controller controls the depth adjuster so that depth values of remaining objects are adjusted as much as a depth adjustment ratio in which the depth value of the object included in the saliency region is adjusted to the depth value of the predetermined range.

4. The multiview image display apparatus as claimed in claim 1, wherein the controller performs a control so that depth values of the object included in the saliency region and an adjacent object are adjusted to the depth value of the predetermined range.

5. The multiview image display apparatus as claimed in claim 1, wherein when a pixel area of the object included in the saliency region is a preset pixel value or more, the controller performs a control so that the depth value of the object is adjusted to the depth value of the predetermined range.

6. The multiview image display apparatus as claimed in claim 1, wherein the controller shifts the depth value of the input image so that depth values of remaining objects included in the input image are adjusted as much as a degree of adjustment of the depth value of the object included in the saliency region.

7. The multiview image display apparatus as claimed in claim 1, wherein the predetermined range is the distortion non-awareness section in which a degree of distortion awareness is calculated to be low by an experiment.

8. The multiview image display apparatus as claimed in claim 1,
    wherein the controller adjusts the depth value of the object included in the saliency region so that a distortion phenomenon is minimized in a pseudo stereo section.

9. A multiview image display method comprising:
    identifying a saliency region of a user from an input image and adjusting a depth value of an object included in the saliency region to a depth value of a predetermined range;
    rendering a multiview image comprising a plurality of images of different viewpoints based on the image in which the depth value is adjusted; and
    displaying the multiview image in a predetermined arrangement pattern,
    wherein the multiview image has a total of N views,
    wherein the predetermined arrangement pattern includes an arrangement pattern where a pattern in which first view to (N/2)th view are sequentially arranged and (N/2)−1th view to first view are inversely arranged is repeated,
    wherein, based on the N being an odd number, the pattern in which the first view to an Ath view are sequentially arranged and a Bth view to the first view are inversely arranged is repeated, where A is an integer greater than (N/2) and B is an integer smaller than (N/2),
    wherein the adjusting of the depth value of the object included in the saliency region comprises adjusting the depth value of the object included in the saliency region based on information on respective depth sections, and wherein each of different depth values included in each section of the respective depth sections provides a same three-dimensional (3D) effect to a viewer in the each section, wherein the adjusting of the depth value of the object included in the saliency region comprises adjusting the depth value of the object included in the saliency region to a depth value close to a reference value, from among the different depth values included in the each section, and wherein the reference value is a maximum protrusion intensity in a distortion non-awareness section.

10. The multiview image display method as claimed in claim 9, wherein in the adjusting of the depth value of the object included in the saliency region to the depth value of the predetermined range, when the object included in the saliency region is a foreground object and a depth value of the foreground object is not within the predetermined depth range, the depth value of the foreground object is adjusted to the depth value of the predetermined range.

11. The multiview image display method as claimed in claim 9, wherein in the adjusting of the depth value of the object included in the saliency region to the depth value of the predetermined range, depth values of remaining objects are adjusted as much as a depth adjustment ratio in which the depth value of the object included in the saliency region is adjusted to the depth value of the predetermined range.

12. The multiview image display method as claimed in claim 9, wherein in the adjusting of the depth value of the object included in the saliency region to the depth value of the predetermined range, depth values of the object included in the saliency region and an adjacent object are adjusted to the depth value of the predetermined range.

13. A multiview image processing apparatus comprising:
a depth adjuster;
a renderer; and
a controller configured to identify a saliency region of a user from an input image,
control the depth adjuster to adjust a depth value of an object included in the saliency region to a depth value of a predetermined range, and
control the renderer to render a multiview image comprising a plurality of images of different viewpoints based on an image in which the depth value is adjusted, and wherein the multiview image is rendered based on a predetermined arrangement, wherein the multiview image has a total of N views, wherein a pattern of the predetermined arrangement includes an arrangement pattern where a pattern in which first view to (N/2)th view are sequentially arranged and (N/2)−1th view to first view are inversely arranged is repeated, wherein, based on the N being an odd number, the pattern in which the first view to an Ath view are sequentially arranged and a Bth view to the first view are inversely arranged is repeated, where A is an integer greater than (N/2) and B is an integer smaller than (N/2), wherein the controller is further configured to control the depth adjuster to adjust the depth value of the object included in the saliency region based on information on respective depth sections, and wherein each of different depth values included in each section of the respective depth sections provides a same three-dimensional (3D) effect to a viewer in the each section, wherein the controller is further configured to control the depth adjuster to adjust the depth value of the object included in the saliency region to a depth value close to a reference value, from among the different depth values included in the each section, and wherein the reference value is a maximum protrusion intensity in a distortion non-awareness section.

14. The multiview image processing apparatus as claimed in claim 13, wherein the controller controls the depth adjuster to adjust a depth value of a foreground object to the depth value of the predetermined range if the foreground object in not within the predetermined range.

15. The multiview image processing apparatus as claimed in claim 13, wherein the controller controls the depth adjuster so that depth values of remaining objects are adjusted as much as a depth adjustment ratio in which the depth value of the object included in the saliency region is adjusted to the depth value of the predetermined range.

16. The multiview image processing apparatus as claimed in claim 13, wherein the controller adjusts the depth value of the object included in the saliency region so that a distortion phenomenon is minimized in a pseudo stereo section.

* * * * *